United States Patent
Ueda et al.

(10) Patent No.: US 10,816,018 B2
(45) Date of Patent: Oct. 27, 2020

(54) HYDRAULIC DRIVING DEVICE OF INDUSTRIAL VEHICLE

(71) Applicants: KABUSHIKI KAISHA TOYOTA JIDOSHOKKI, Kariya-shi, Aichi (JP); NISHINA INDUSTRIAL CO., LTD., Nagano-shi, Nagano (JP)

(72) Inventors: Yuki Ueda, Kariya (JP); Koshiro Saji, Kariya (JP); Shigeto Nakajima, Nagano (JP); Yukinori Takeda, Nagano (JP); Koichi Kinoshita, Kariya (JP)

(73) Assignees: KABUSHIKI KAISHA TOYOTA JIDOSHOKKI, Kariya-shi, Aichi (JP); NISHIA INDUSTRIAL CO., LTD., Nagano-shi, Nagano (JP)

( * ) Notice: Subject to any disclaimer, the term of this patent is extended or adjusted under 35 U.S.C. 154(b) by 67 days.

(21) Appl. No.: 16/053,202

(22) Filed: Aug. 2, 2018

(65) Prior Publication Data

US 2019/0040879 A1 Feb. 7, 2019

(30) Foreign Application Priority Data

Aug. 3, 2017 (JP) ................................ 2017-150917
Mar. 26, 2018 (JP) ................................ 2018-058816

(51) Int. Cl.
*F15B 13/04* (2006.01)
*F15B 11/10* (2006.01)
(Continued)

(52) U.S. Cl.
CPC .......... *F15B 13/0403* (2013.01); *B62D 5/087* (2013.01); *F15B 11/10* (2013.01);
(Continued)

(58) Field of Classification Search
CPC ....... B62D 5/087; F15B 11/10; F15B 13/0403
See application file for complete search history.

(56) References Cited

U.S. PATENT DOCUMENTS 3,746,040 A 7/1973 Paul
2013/0098023 A1 4/2013 Yoshino
(Continued)

FOREIGN PATENT DOCUMENTS

DE 10 2005 009 583 A1 8/2006
JP 2-175600 A 7/1990
(Continued)

OTHER PUBLICATIONS

Communication dated Jan. 18, 2019, from the European Patent Office in counterpart European Application No. 18187228.4.

*Primary Examiner* — Thomas E Lazo
*Assistant Examiner* — Daniel S Collins
(74) *Attorney, Agent, or Firm* — Sughrue Mion, PLLC

(57) ABSTRACT

A hydraulic driving device of an industrial vehicle includes: a tank which stores hydraulic oil; a hydraulic pump which includes a suction port sucking the hydraulic oil and a discharge port discharging the hydraulic oil; a hydraulic cylinder which is driven by the hydraulic oil discharged from the discharge port of the hydraulic pump; a direction switching valve which is disposed among the hydraulic pump, the tank, and the hydraulic cylinder and switches a hydraulic oil flow direction in response to an operation state of operation means for driving the hydraulic cylinder; in which the direction switching valve includes a main spool which moves in response to the operation state of the operation means and a flow regulator which is disposed inside the main spool to control a flow rate of the hydraulic oil flowing from the hydraulic cylinder to the tank.

15 Claims, 24 Drawing Sheets

(51) Int. Cl.
  *F15B 11/16*      (2006.01)
  *F15B 13/042*     (2006.01)
  *F15B 13/06*      (2006.01)
  *F16K 11/07*      (2006.01)
  *B62D 5/087*      (2006.01)
  *B66F 9/22*       (2006.01)

(52) U.S. Cl.
  CPC .......... *F15B 11/16* (2013.01); *F15B 13/0426* (2013.01); *F15B 13/06* (2013.01); *F16K 11/0716* (2013.01); *B66F 9/22* (2013.01); *F15B 2211/30525* (2013.01); *F15B 2211/329* (2013.01); *F15B 2211/4053* (2013.01)

(56) References Cited

U.S. PATENT DOCUMENTS

| | | | |
|---|---|---|---|
| 2015/0369260 A1* | 12/2015 | Holter | F15B 13/0403 137/512.3 |
| 2018/0291935 A1 | 10/2018 | Kondo | |

FOREIGN PATENT DOCUMENTS

| | | |
|---|---|---|
| JP | 2008-157407 A | 7/2008 |
| JP | 2012013123 A | 1/2012 |
| JP | 2015-72055 A | 4/2015 |
| JP | 2016-217378 A | 12/2016 |

\* cited by examiner

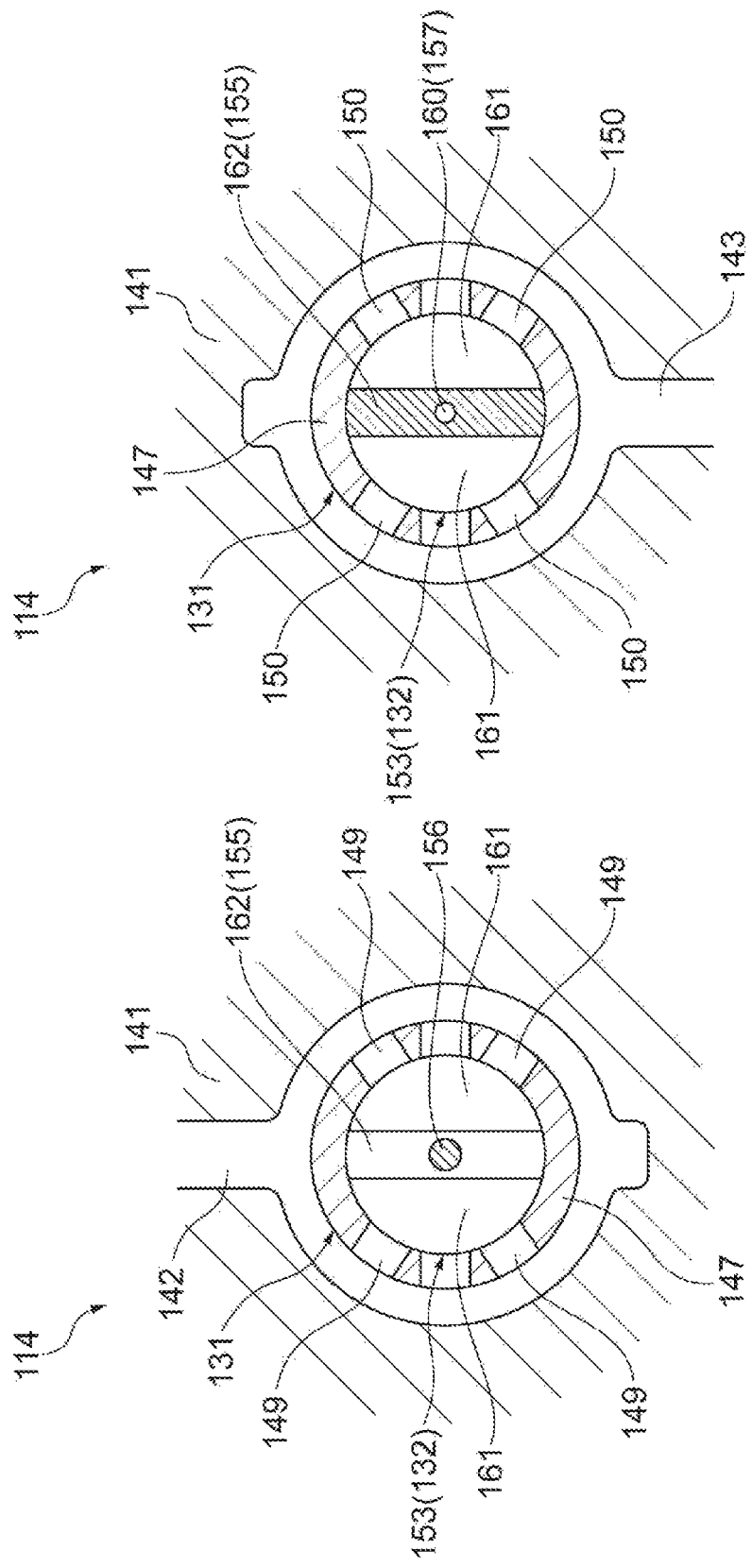

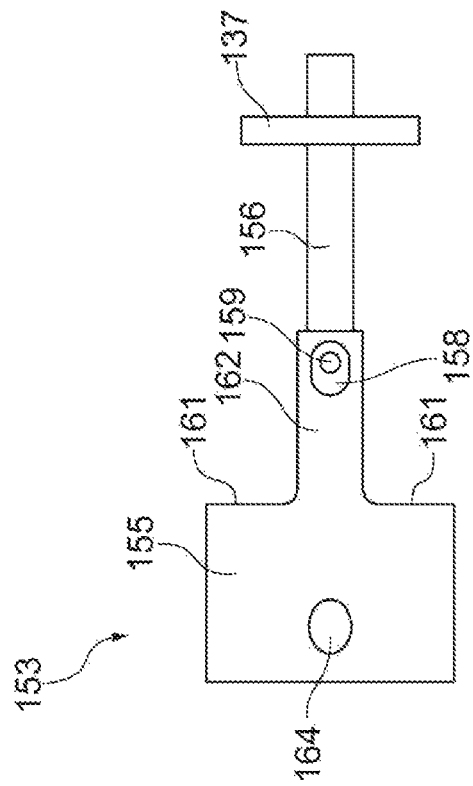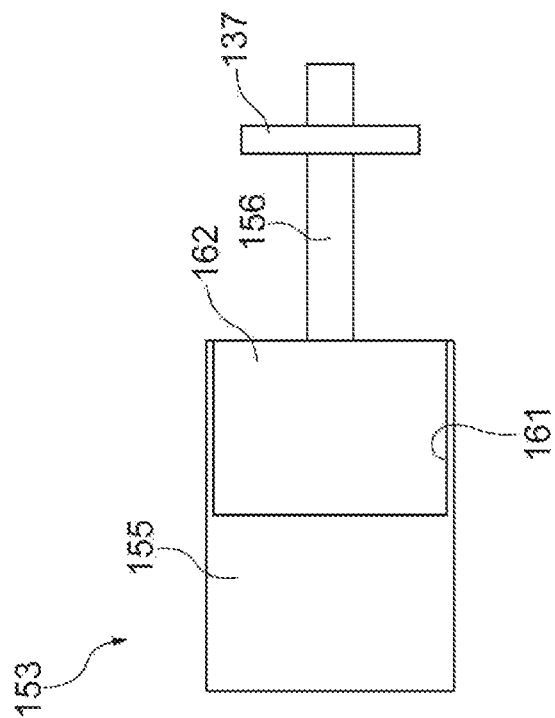

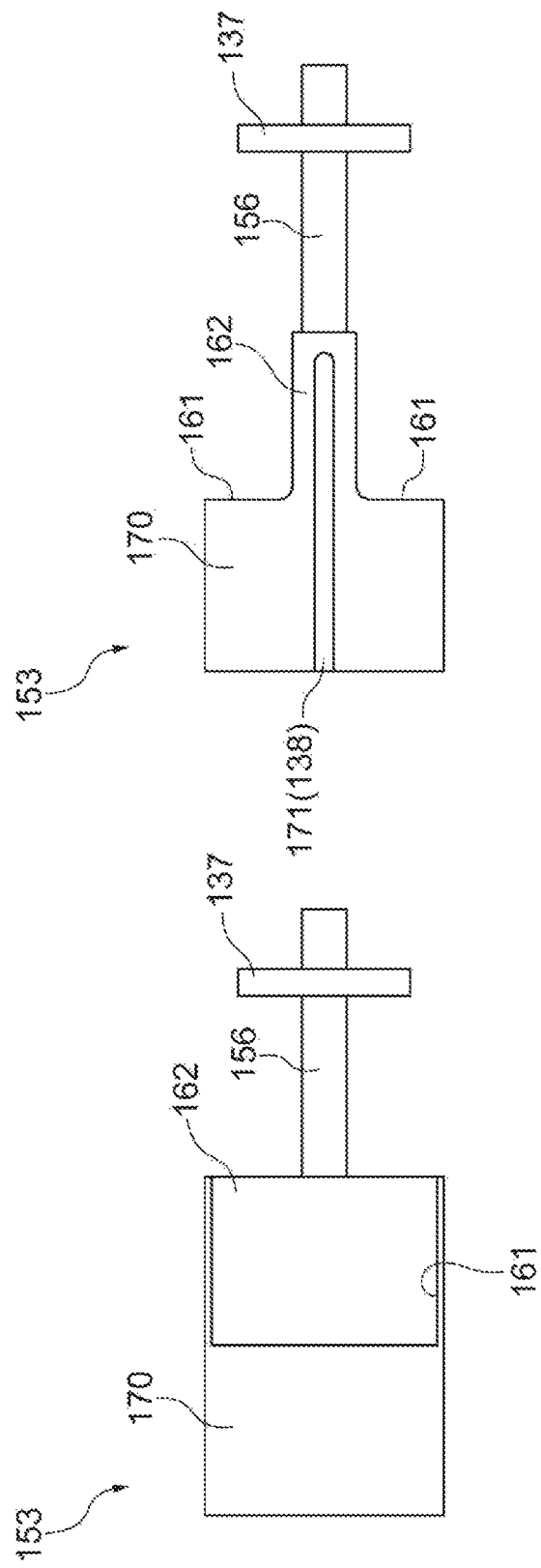

HYDRAULIC DRIVING DEVICE OF INDUSTRIAL VEHICLE

This application claims the benefit of foreign priority to Japanese Patent Application No. JP2017-150917, filed Aug. 3, 2017, and Japanese Patent Application No. JP2018-058816, filed Mar. 26, 2018, which are incorporated by reference in its entirety

TECHNICAL FIELD

An aspect of the present disclosure relates to a hydraulic driving device of an industrial vehicle.

BACKGROUND

As a hydraulic driving device of an industrial vehicle, for example, a technology disclosed in Japanese Unexamined Patent Publication No. 2012-13123 is known. The hydraulic driving device disclosed in Japanese Unexamined Patent Publication No. 2012-13123 includes first and second pumps, a main control valve connected to discharge ports of the first and second pumps, a regenerative control valve block disposed between the main control valve and first and second boom cylinders, and an energy storage accumulator connected to the regenerative control valve block. The regenerative control valve block stores the position energy of the raised boom from the first boom cylinder to the accumulator as an accumulated pressure when the boom is lowered for the purpose of regeneration and discharges the oil accumulated in the accumulator to the first boom cylinder and the second boom cylinder when the boom is raised. The regenerative control valve block includes a main spool of a pilot operated proportional operation type and two electromagnetic proportional valves which are respectively connected to both ends of the main spool through a pilot passage and respectively adjust the operation amount of the main spool.

SUMMARY

However, in the above-described related art, since two electromagnetic proportional valves controlling the main spool are disposed outside the main spool, the regenerative control valve block increases in size and cost.

An object of an aspect of the present disclosure is to provide a hydraulic driving device of an industrial vehicle capable of realizing space saving and low cost.

According to an aspect of the present disclosure, there is provided a hydraulic driving device of an industrial vehicle including: a tank which stores hydraulic oil; a hydraulic pump which includes a suction port sucking the hydraulic oil and a discharge port discharging the hydraulic oil; a hydraulic cylinder which is driven by the hydraulic oil discharged from the discharge port of the hydraulic pump; a direction switching valve which is disposed among the hydraulic pump, the tank, and the hydraulic cylinder and switches a hydraulic oil flow direction in response to an operation state of operation means for driving the hydraulic cylinder, in which the direction switching valve includes a main spool which moves in response to the operation state of the operation means and a flow regulator which is disposed inside the main spool to control a flow rate of the hydraulic oil flowing from the hydraulic cylinder to the tank.

In such a hydraulic driving device, the flow regulator that controls the flow rate of the hydraulic oil flowing from the hydraulic cylinder to the tank is disposed inside the main spool moving in response to the operation state of the operation means. For this reason, there is no need to dispose a pilot electromagnetic proportional valve or the like for controlling the main spool outside the main spool. Accordingly, it is possible to realize space saving and low cost.

The hydraulic driving device may further comprising: a common hydraulic oil passage which connects the hydraulic cylinder to the direction switching valve so that the hydraulic oil flows in both directions between the hydraulic cylinder and the direction switching valve; a first hydraulic oil passage which connects the discharge port of the hydraulic pump to the direction switching valve so that the hydraulic oil flows from the hydraulic pump to the direction switching valve; and a second hydraulic oil passage which connects the tank to the direction switching valve so that the hydraulic oil flows from the direction switching valve to the tank.

The hydraulic driving device may further include a third hydraulic oil passage which connects the suction port of the hydraulic pump to the direction switching valve so that the hydraulic oil flows from the direction switching valve to the hydraulic pump, in which the flow regulator may include a flow regulator spool which is movable in a movement direction of the main spool with respect to the main spool, and in which the direction switching valve includes a first pilot passage which applies a pressure to a closing side of the flow regulator spool and a second pilot passage which applies a pressure to an opening side of the flow regulator spool. In such a configuration, it is possible to perform a so-called cargo handling regeneration of the hydraulic pump in which the hydraulic pump rotates when the hydraulic oil is supplied to the suction port of the hydraulic pump through the third hydraulic oil passage.

The direction switching valve may include a resistance component which generates pressure loss in the hydraulic oil flowing from the common hydraulic oil passage to the third hydraulic oil passage. In such a configuration, pressure loss is generated in the flow rate of the hydraulic oil flowing from the common hydraulic oil passage to the third hydraulic oil passage due to the resistance component. At this time, since a pressure applied to the opening side of the flow regulator spool decreases as the flow rate of the hydraulic oil flowing from the common hydraulic oil passage to the third hydraulic oil passage increases, the flow regulator spool is easily closed. For this reason, the flow rate of the hydraulic oil flowing in the second hydraulic oil passage decreases even when the flow rate of the hydraulic oil flowing in the third hydraulic oil passage increases. Thus, the flow rate of the hydraulic oil flowing in the common hydraulic oil passage which is the sum of the flow rate of the hydraulic oil flowing in the second hydraulic oil passage and the flow rate of the hydraulic oil flowing in the third hydraulic oil passage can be maintained constant. Accordingly, the operation speed of the hydraulic cylinder can be maintained constant.

The flow regulator spool may include a sliding portion which slides with respect to the main spool and a rod portion which extends from the sliding portion in the movement direction of the main spool and the resistance component may be a flange-shaped resistance component which protrudes from a peripheral surface of the rod portion. In such a configuration, since the flange-shaped resistance component is provided in the flow regulator spool, there is no need to provide the resistance component in the main spool and to perform unnecessary processing on the existing main spool.

The flow regulator may include a spring which urges the flow regulator spool in an opening direction and the flange-shaped resistance component may receive the spring. In such a configuration, the flange-shaped resistance component has a function of receiving the spring in addition to a function of generating pressure loss in the hydraulic oil flowing from the common hydraulic oil passage to the third hydraulic oil passage. For this reason, a portion that receives the spring may not be separately provided in the flow regulator spool. Accordingly, a structure of the flow regulator can be simplified.

An outer peripheral edge of the flange-shaped resistance component may have a knife edge shape. In such a configuration, it is possible to prevent a problem in which the hydraulic oil is difficult to flow between the flange-shaped resistance component and the main spool even when the viscosity of the hydraulic oil increases due to a decrease in temperature of the hydraulic oil. Thus, it is possible to prevent a change in the flow rate characteristics of the hydraulic oil flowing in the common hydraulic oil passage due to a change in temperature of the hydraulic oil.

The flange-shaped resistance component may be provided with a through-hole penetrating in the movement direction of the main spool. In such a configuration, when the number or dimension of the through-hole is changed, the flow rate of the hydraulic oil passing through the flange-shaped resistance component changes. For this reason, a pressure applied to the opening side of the flow regulator spool changes and the closed state of the flow regulator spool changes. Thus, when the number or dimension of the through-hole is adjusted, the flow rate characteristics of the hydraulic oil flowing in the common hydraulic oil passage can be adjusted. Accordingly, the flow rate of the hydraulic oil flowing in the common hydraulic oil passage can be reliably maintained constant.

The inner diameter of a region corresponding to the flange-shaped resistance component in the main spool may be larger than an inner diameter of a region corresponding to the sliding portion in the main spool. In such a configuration, the diameter of the flange-shaped resistance component can be increased to the extent that the inner diameter of the region corresponding to the flange-shaped resistance component in the main spool is larger than the inner diameter of the region corresponding to the sliding portion in the main spool. Since the diameter of the flange-shaped resistance component is large, the pressure loss necessary for the flange-shaped resistance component decreases. Accordingly, it is possible to improve the regeneration efficiency at the time of performing a so-called regeneration operation in which the hydraulic oil is supplied from the hydraulic cylinder to the hydraulic pump to rotate the hydraulic pump.

The direction switching valve may include a housing, in which the main spool which moves with respect to the housing in response to the operation state of the operation means, in which the flow regulator includes a flow regulator spool which is movable in a movement direction of the main spool with respect to the main spool, in which the housing is provided with a first hydraulic oil passage connected to the hydraulic cylinder and a second hydraulic oil passage connected to the tank, in which the flow regulator spool is provided with a pilot passage which guides a pilot pressure applied to the closing side of the flow regulator spool, and in which the main spool is provided with a first communication port which communicates the first hydraulic oil passage with an inner space of the main spool, a second communication port which communicates the second hydraulic oil passage with the inner space of the main spool, and a third communication port which communicates the first hydraulic oil passage with the pilot passage.

In such a hydraulic driving device, the flow regulator which controls the flow rate of the hydraulic oil flowing from the hydraulic cylinder to the tank is disposed inside the main spool moving with respect to the housing in response to the operation state of the operation means. For this reason, a pilot electromagnetic proportional valve or the like for controlling the main spool may not be disposed outside the main spool. Further, in the flow regulator, since an opening degree of the flow regulator spool changes in response to a pressure difference between the pilot pressure applied to the closing side of the flow regulator spool and the pilot pressure applied to the opening side of the flow regulator spool, the flow rate of the hydraulic oil flowing from the hydraulic cylinder to the tank changes. Here, the pilot passage which guides a pilot pressure applied to the closing side of the flow regulator spool is provided in the flow regulator spool. Thus, since the pilot passage may not be provided in the housing, the housing decreases in size to that extent. With the above-described configuration, it is possible to realize space saving and low cost of the hydraulic driving device.

The flow regulator spool may include a columnar sliding portion which slides with respect to the main spool and the pilot passage may be a through-hole which is provided inside the sliding portion and extends in an axial direction of the sliding portion to an end opposite to the inner space of the main spool of the sliding portion. In such a configuration, the pilot passage can guide a pilot pressure applied to the closing side of the flow regulator spool without influencing the sliding performance of the sliding portion with respect to the main spool.

The flow regulator spool may include a columnar sliding portion which slides with respect to the main spool and the pilot passage may be a groove portion which is provided on a peripheral surface of the sliding portion and extends in an axial direction of the sliding portion to an end opposite to the inner space of the main spool of the sliding portion. In such a configuration, the pilot passage can be easily processed in the sliding portion.

A portion on the side of the inner space of the main spool of the sliding portion may be provided with a hollow portion facing the second communication port. In such a configuration, it is possible to reliably communicate the second communication port with the inner space of the main spool by the hollow portion with a simple structure, for example, even when the axial dimension of the sliding portion is set to be large in order to ensure the pilot passage.

A rotation regulation member that regulates a relative rotation between the flow regulator spool and the main spool may be disposed between the main spool and a portion opposite to the inner space of the main spool of the sliding portion. In such a configuration, since the sliding portion is provided with the hollow portion, a relative rotation between the flow regulator spool and the main spool is prevented by the rotation regulation member even when a relative rotation between the flow regulator spool and the main spool easily occurs during the sliding movement of the sliding portion.

An eccentric prevention groove which prevents the eccentricity of the flow regulator spool may be provided at a position corresponding to the opposite side to the rotation regulation member with respect to an axis of the sliding portion in the main spool or the sliding portion. In such a configuration, an unbalanced pressure is eliminated by the eccentric prevention groove even when the flow regulator spool tries to be eccentric since a pressure applied to the flow regulator spool becomes unbalanced due to the rotation regulation member. Thus, since the eccentricity of the flow regulator spool is prevent, the sliding performance of the sliding portion is improved.

The direction switching valve may include a housing, in which the main spool which moves with respect to the housing in response to the operation state of the operation means, in which the flow regulator includes a flow regulator spool which is movable in a movement direction of the main spool with respect to the main spool, in which the housing is provided with a first hydraulic oil passage connected to the hydraulic cylinder and a second hydraulic oil passage connected to the tank, and in which the main spool is provided with a pilot passage which guides a pilot pressure applied to the closing side of the flow regulator spool, a first communication port which communicates the first hydraulic oil passage with an inner space of the main spool, a second communication port which communicates the second hydraulic oil passage with the inner space of the main spool, and a third communication port which communicates the first hydraulic oil passage with the pilot passage.

In such a hydraulic driving device, the flow regulator which controls the flow rate of the hydraulic oil flowing from the hydraulic cylinder to the tank is disposed inside the main spool moving with respect to the housing in response to the operation state of the operation means. For this reason, a pilot electromagnetic proportional valve or the like for controlling the main spool may not be disposed outside the main spool. Further, in the flow regulator, since an opening degree of the flow regulator spool changes in response to a pressure difference between the pilot pressure applied to the closing side of the flow regulator spool and the pilot pressure applied to the opening side of the flow regulator spool, the flow rate of the hydraulic oil flowing from the hydraulic cylinder to the tank changes. Here, the pilot passage which guides a pilot pressure applied to the closing side of the flow regulator spool is provided in the main spool. Thus, since the pilot passage may not be provided in the housing, the housing decreases in size to that extent. With the above-described configuration, it is possible to realize space saving and low cost of the hydraulic driving device.

The housing may be provided with a third hydraulic oil passage which is connected to the suction port of the hydraulic pump and the main spool may be provided with a fourth communication port which communicates the third hydraulic oil passage with the inner space of the main spool. In such a configuration, it is possible to perform a so-called energy regeneration operation in which the hydraulic pump rotates when the hydraulic oil is supplied from the hydraulic cylinder to the suction port of the hydraulic pump through the third hydraulic oil passage.

According to an aspect of the present disclosure, it is possible to realize space saving and low cost.

BRIEF DESCRIPTION OF THE DRAWINGS

FIG. 17A is a cross-sectional view taken along a line XVIIa-XVIIa of FIG. 16 and FIG. 17B is a cross-sectional view taken along a line XVIIb-XVIIb of FIG. 16.

FIG. 18A is a side view of a flow regulator spool illustrated in FIG. 16 and FIG. 18B is a plan view of the flow regulator spool illustrated in FIG. 16.

FIG. 21A is a side view of a flow regulator spool illustrated in FIGS. 20A and 20B and FIG. 21B is a plan view of the flow regulator spool illustrated in FIGS. 20A and 20B.

DETAILED DESCRIPTION

Figure 1:
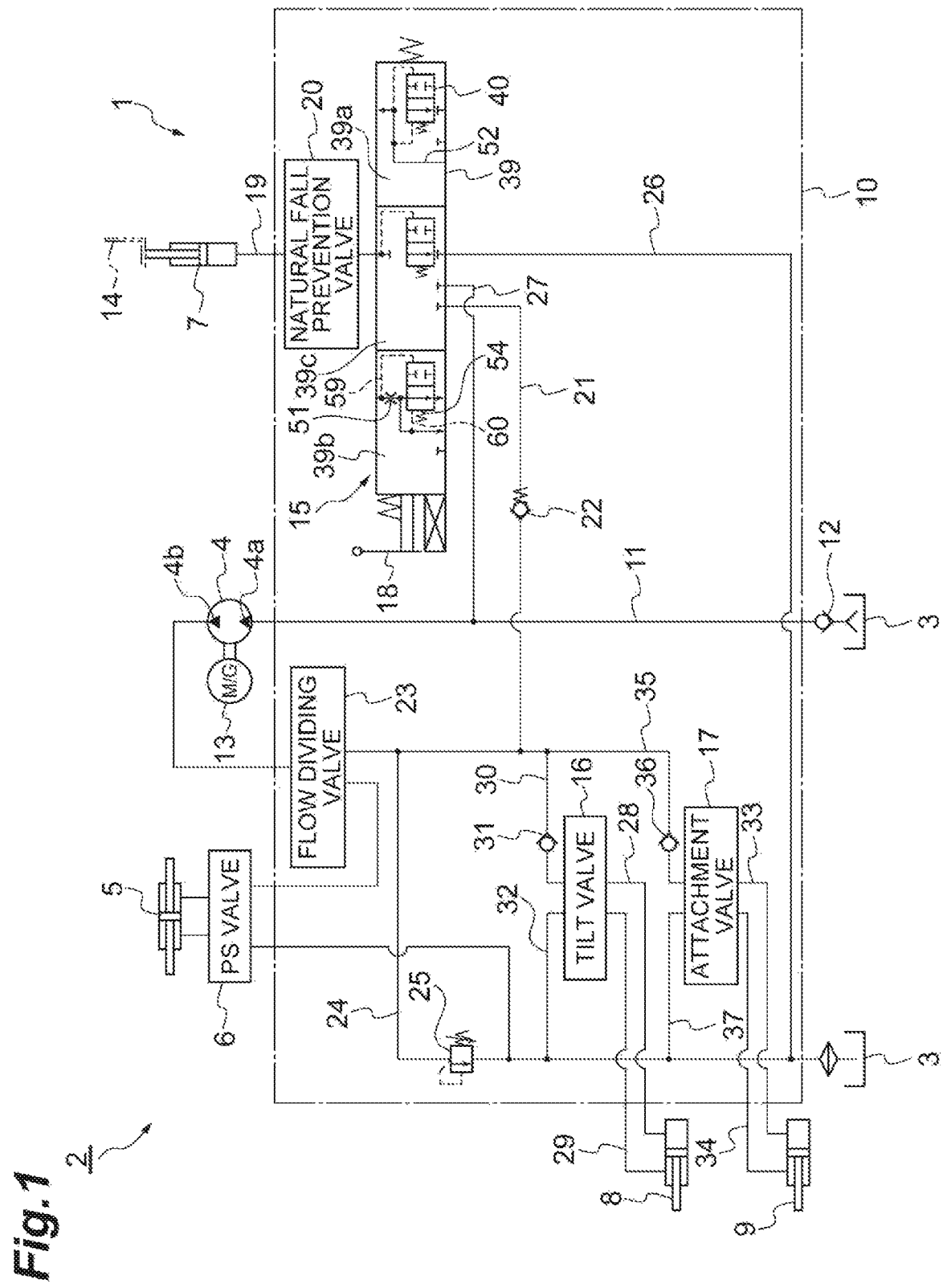
FIG. 1 is a hydraulic circuit diagram illustrating a hydraulic driving device of an industrial vehicle according to a first embodiment.

Hereinafter, embodiments of the present disclosure will be described in detail with reference to the drawings. Additionally, in the drawings, the same reference numerals will be given to the same or equivalent components and a repetitive description thereof will be omitted.

FIG. 1 is a hydraulic circuit diagram illustrating a hydraulic driving device of an industrial vehicle according to a first embodiment. In FIG. 1, a hydraulic driving device 1 of the present embodiment is mounted on a forklift 2 which is an industrial vehicle.

The hydraulic driving device 1 includes a tank 3, a hydraulic pump 4, a power steering cylinder (a PS cylinder) 5, a power steering valve (a PS valve) 6, a lift cylinder 7, a tilt cylinder 8, an attachment cylinder 9, and a cargo handling valve unit 10.

The tank 3 stores hydraulic oil. The hydraulic pump 4 includes a suction port 4a which sucks the hydraulic oil and a discharge port 4b which discharges the hydraulic oil. The suction port 4a is connected to the tank 3 through a hydraulic oil passage 11. A check valve 12 which allows only the flow of the hydraulic oil from the tank 3 to the hydraulic pump 4 is disposed in the hydraulic oil passage 11. The hydraulic pump 4 is driven by a motor 13.

The PS cylinder 5 is a double rod type hydraulic cylinder which is driven by the hydraulic oil discharged from the discharge port 4b of the hydraulic pump 4. The PS valve 6 is a direction switching valve which is disposed among the hydraulic pump 4, the tank 3, and the PS cylinder 5 and switches a hydraulic oil flow direction in response to an operation state of a handle (not illustrated).

The lift cylinder 7 is a hydraulic cylinder which is driven by the hydraulic oil discharged from the discharge port 4b of the hydraulic pump 4 and elevates a fork 14. The tilt cylinder 8 is a hydraulic cylinder which is driven by the hydraulic oil discharged from the discharge port 4b of the hydraulic pump 4 and tilts a mast (not illustrated). The attachment cylinder 9 is a hydraulic cylinder which is driven by the hydraulic oil discharged from the discharge port 4b of the hydraulic pump 4 and operates an attachment (not illustrated).

The cargo handling valve unit 10 includes a lift valve 15 which is disposed among the hydraulic pump 4, the tank 3, and the lift cylinder 7, a tilt valve 16 which is disposed among the hydraulic pump 4, the tank 3, and the tilt cylinder 8, and an attachment valve 17 which is disposed among the hydraulic pump 4, the tank 3, and the attachment cylinder 9.

The lift valve 15 is a direction switching valve which switches a hydraulic oil flow direction in response to an operation state of a lift operation lever 18. The lift operation lever 18 is operation means for elevating the fork 14 by lengthening and shortening the lift cylinder 7. The lift valve 15 will be described later.

The tilt valve 16 is a direction switching valve which switches a hydraulic oil flow direction in response to an operation state of a tilt operation lever (not illustrated). The attachment valve 17 is a direction switching valve which switches a hydraulic oil flow direction in response to an operation state of an attachment operation lever (not illustrated).

The bottom chamber of the lift cylinder 7 and the lift valve 15 are connected to each other through a hydraulic oil passage 19. The hydraulic oil passage 19 constitutes a common hydraulic oil passage through which the hydraulic oil flows in both directions between the lift valve 15 and the lift cylinder 7. A natural fall prevention valve 20 is disposed in the hydraulic oil passage 19. The natural fall prevention valve 20 is a valve which prevents a natural fall of the fork 14 when the lift cylinder 7 is naturally shortened.

The discharge port 4b of the hydraulic pump 4 and the lift valve 15 are connected to each other through a hydraulic oil passage 21. The hydraulic oil passage 21 constitutes a first hydraulic oil passage through which the hydraulic oil flows from the hydraulic pump 4 to the lift valve 15. A check valve 22 which allows only the flow of the hydraulic oil from the hydraulic pump 4 to the lift valve 15 is disposed in the hydraulic oil passage 21. A flow dividing valve 23 is disposed between the hydraulic pump 4 and the check valve 22 in the hydraulic oil passage 21. The flow dividing valve 23 is a valve which divides the hydraulic oil from the hydraulic pump 4 to the PS side and the cargo handling side.

A portion between the check valve 22 and the flow dividing valve 23 in the hydraulic oil passage 21 is connected to the tank 3 through a hydraulic oil passage 24. A relief valve 25 which is opened when a pressure of the hydraulic oil passage 24 becomes a set pressure or more is disposed in the hydraulic oil passage 24.

The lift valve 15 and the tank 3 are connected to each other through a hydraulic oil passage 26. The hydraulic oil passage 26 constitutes a second hydraulic oil passage through which the hydraulic oil flows from the lift valve 15 to the tank 3. The lift valve 15 and the hydraulic oil passage 11 are connected to each other through a hydraulic oil passage 27. One end of the hydraulic oil passage 27 is connected to a position between the hydraulic pump 4 and the check valve 12 in the hydraulic oil passage 11. The portions on the side of the hydraulic pump 4 in the hydraulic oil passage 27 and the hydraulic oil passage 11 constitute a third hydraulic oil passage through which the hydraulic oil flows from the lift valve 15 to the hydraulic pump 4.

The bottom chamber and the rod chamber of the tilt cylinder 8 are respectively connected to the tilt valve 16 through hydraulic oil passages 28 and 29. A portion between the check valve 22 and the flow dividing valve 23 in the hydraulic oil passage 21 is connected to the tilt valve 16 through a hydraulic oil passage 30. A check valve 31 which allows only the flow of the hydraulic oil from the flow dividing valve 23 to the tilt valve 16 is disposed in the hydraulic oil passage 30. The tilt valve 16 is connected to the tank 3 through hydraulic oil passages 32 and 24.

The bottom chamber and the rod chamber of the attachment cylinder 9 are respectively connected to the attachment valve 17 through hydraulic oil passages 33 and 34. A portion between the check valve 22 and the flow dividing valve 23 in the hydraulic oil passage 21 is connected to the attachment valve 17 through the hydraulic oil passage 35. A check valve 36 which allows only the flow of the hydraulic oil from the flow dividing valve 23 to the attachment valve 17 is disposed in the hydraulic oil passage 35. The attachment valve 17 is connected to the tank 3 through the hydraulic oil passages 37 and 24.

Figure 2:
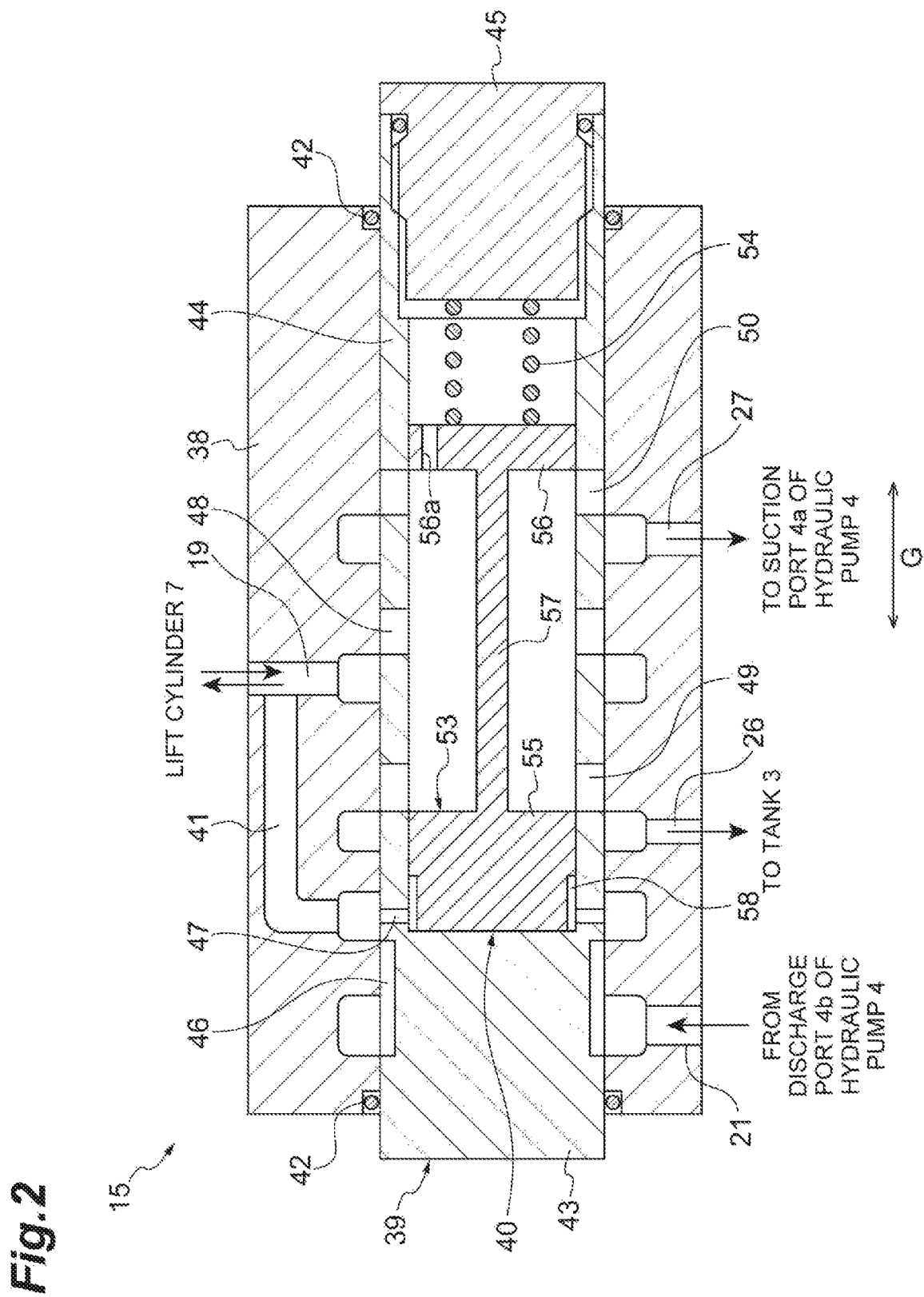
FIG. 2 is a cross-sectional view of a lift valve illustrated in FIG. 1.

FIG. 2 is a cross-sectional view of the lift valve 15. In FIGS. 1 and 2, the lift valve 15 is a manual direction switching valve. The lift valve 15 includes a body 38, a main spool 39 which is disposed in the body 38 to be movable, and a flow regulator 40 which is disposed inside the main spool 39.

The body 38 is provided with a part of the above-described hydraulic oil passages 19, 21, 26, and 27 and a passage 41 connected to the hydraulic oil passage 19. The hydraulic oil passages 21, 26, and 27 are disposed on the opposite side to the hydraulic oil passage 19 with the main spool 39 interposed therebetween. Two seal rings 42 are interposed between the body 38 and the main spool 39.

The main spool 39 includes a columnar base portion 43 and a cylindrical portion 44 which extends from the base portion 43 in the axial direction (a direction G of FIG. 2). A front end portion of the cylindrical portion 44 is blocked by a plug 45. The above-described lift operation lever 18 is mechanically connected to the main spool 39 (see FIG. 1). The main spool 39 moves in the axial direction in response to the operation state of the lift operation lever 18.

The peripheral surface of the base portion 43 is provided with a communication groove 46 communicating the hydraulic oil passage 21 and the passage 41 with each other. The cylindrical portion 44 is provided with a communication port 47 which communicates the passage 41 and the inside of the main spool 39 with each other, a communication port 48 which communicates the hydraulic oil passage 19 and the inside of the main spool 39 with each other, a communication port 49 which communicates the hydraulic oil passage 26 and the inside of the main spool 39 with each other, and a communication port 50 which communicates the hydraulic oil passage 27 and the inside of the main spool 39 with each other. The communication port 48 constitutes a throttle portion 51 (see FIG. 1).

The main spool 39 is movable between a full open position 39a in which the hydraulic oil passage 19 communicates with the hydraulic oil passage 21 and the hydraulic oil passage 19 is blocked from the hydraulic oil passages 26 and 27 and a full open position 39b in which the hydraulic oil passage 19 communicates with the hydraulic oil passages 26 and 27 and the hydraulic oil passage 19 is blocked from the hydraulic oil passage 21 as illustrated in FIG. 1. A neutral position (a full closed position) 39c which blocks the hydraulic oil passage 19 from the hydraulic oil passages 21, 26, and 27 exists between the full open positions 39a and 39b.

In a state in which the main spool 39 is located at the neutral position 39c (a state of FIG. 2), a flow of the hydraulic oil does not occur among the hydraulic pump 4, the tank 3, and the lift cylinder 7. When the main spool 39 is moved toward the full open position 39a (the right side of FIG. 2) by the lift operation lever 18 from a state in which the main spool 39 is located at the neutral position 39c, the hydraulic oil discharged from the discharge port 4b of the hydraulic pump 4 flows in the hydraulic oil passage 21, the communication groove 46, the passage 41, and the hydraulic oil passage 19 to be supplied to the lift cylinder 7. For this reason, the fork 14 is raised when the lift cylinder 7 is lengthened. At this time, the communication groove 46 and the passage 41 constitute a hydraulic oil passage 52 (see FIG. 1) through which the hydraulic oil flows from the hydraulic pump 4 to the lift cylinder 7. Further, the passage area of the hydraulic oil passage 21 is changed in response to the stroke of the main spool 39.

When the main spool 39 is moved toward the full open position 39b (the left side of FIG. 2) by the lift operation lever 18 from a state in which the main spool 39 is located at the neutral position 39c, the hydraulic oil which comes out of the lift cylinder 7 shortened by the own weight of the fork 14 flows to the hydraulic oil passage 19 and the communication port 48 to intrude into the main spool 39. Then, the hydraulic oil flows in the communication port 49 and the hydraulic oil passage 26 to be discharged to the tank 3 and flows in the communication port 50 and the hydraulic oil passage 27 to be supplied to the suction port 4a of the hydraulic pump 4. At this time, the passage areas of the hydraulic oil passages 26 and 27 are changed in response to the stroke of the main spool 39. When the hydraulic oil is supplied to the suction port 4a of the hydraulic pump 4, a so-called cargo handling regeneration of the hydraulic pump 4 which rotates the hydraulic pump 4 by the hydraulic oil is performed.

The flow regulator 40 controls the flow rate of the hydraulic oil flowing from the lift cylinder 7 to the tank 3. The flow regulator 40 includes a flow regulator spool 53 which is movable in the movement direction (the direction G) of the main spool 39 with respect to the main spool 39 and a spring 54 which is disposed between the flow regulator spool 53 and the plug 45.

The flow regulator spool 53 includes columnar sliding portions 55 and 56 which slide with respect to the main spool 39 and a columnar rod portion 57 which connects the sliding portions 55 and 56 to each other. The sliding portion 55 is disposed on the side of the base portion 43. The sliding portion 56 is disposed on the side of the plug 45. The sliding portion 56 is provided with a passage 56a through which hydraulic oil passes. The rod portion 57 extends in the movement direction of the main spool 39. The communication ports 48 to 50 are disposed between the sliding portions 55 and 56.

The peripheral surface of the sliding portion 55 is provided with an annular notch portion 58 which communicates with the communication port 47. The passage 41, the communication port 47, and the notch portion 58 constitute a pilot passage 59 (see FIG. 1) which is a first pilot passage applying a pressure to the closing side of the flow regulator spool 53 (the right side of FIG. 2) when the hydraulic oil flows from the lift cylinder 7 to the tank 3. That is, the pilot passage 59 applies a pressure to the closing side of the communication port 49 of the main spool 39. The pilot passage 59 is connected to the upstream side of the throttle portion 51.

A space between the sliding portions 55 and 56 inside the main spool 39 constitutes a pilot passage 60 (see FIG. 1) which is a second pilot passage applying a pressure to the opening side of the flow regulator spool 53 (the left side of FIG. 2) when the hydraulic oil flows from the lift cylinder 7 to the tank 3. That is, the pilot passage 60 applies a pressure to the opening side of the communication port 49 of the main spool 39. The pilot passage 60 is connected to the downstream side of the throttle portion 51.

The spring 54 is disposed between the sliding portion 56 and the plug 45. The spring 54 urges the flow regulator spool 53 in an opening direction. The sliding portion 56 receives the spring 54.

Such a flow regulator 40 is driven by a pressure difference generated by the main spool 39, specifically, a pressure difference between the upstream side and the downstream side of the communication port 48 (the throttle portion 51) of the main spool 39 and the flow rate (the bypass flow rate) of the hydraulic oil flowing in the hydraulic oil passage 26 is controlled so that the pressure difference is maintained constant.

As described above, in the present embodiment, the flow regulator 40 which controls the flow rate of the hydraulic oil flowing from the lift cylinder 7 to the tank 3 is disposed inside the main spool 39 moving in response to the operation state of the lift operation lever 18. For this reason, a pilot electromagnetic proportional valve or the like for controlling the main spool 39 may not be disposed outside the main spool 39. Accordingly, it is possible to realize the space saving of the cargo handling valve unit 10 by decreasing the size of the cargo handling valve unit 10 including the lift valve 15. Further, it is possible to realize the low cost of the cargo handling valve unit 10.

Further, in the present embodiment, it is possible to perform a so-called cargo handling regeneration of the hydraulic pump 4 which means that the hydraulic pump 4 rotates when the hydraulic oil is supplied to the suction port 4a of the hydraulic pump 4 through the hydraulic oil passages 27 and 11.

Figure 3:
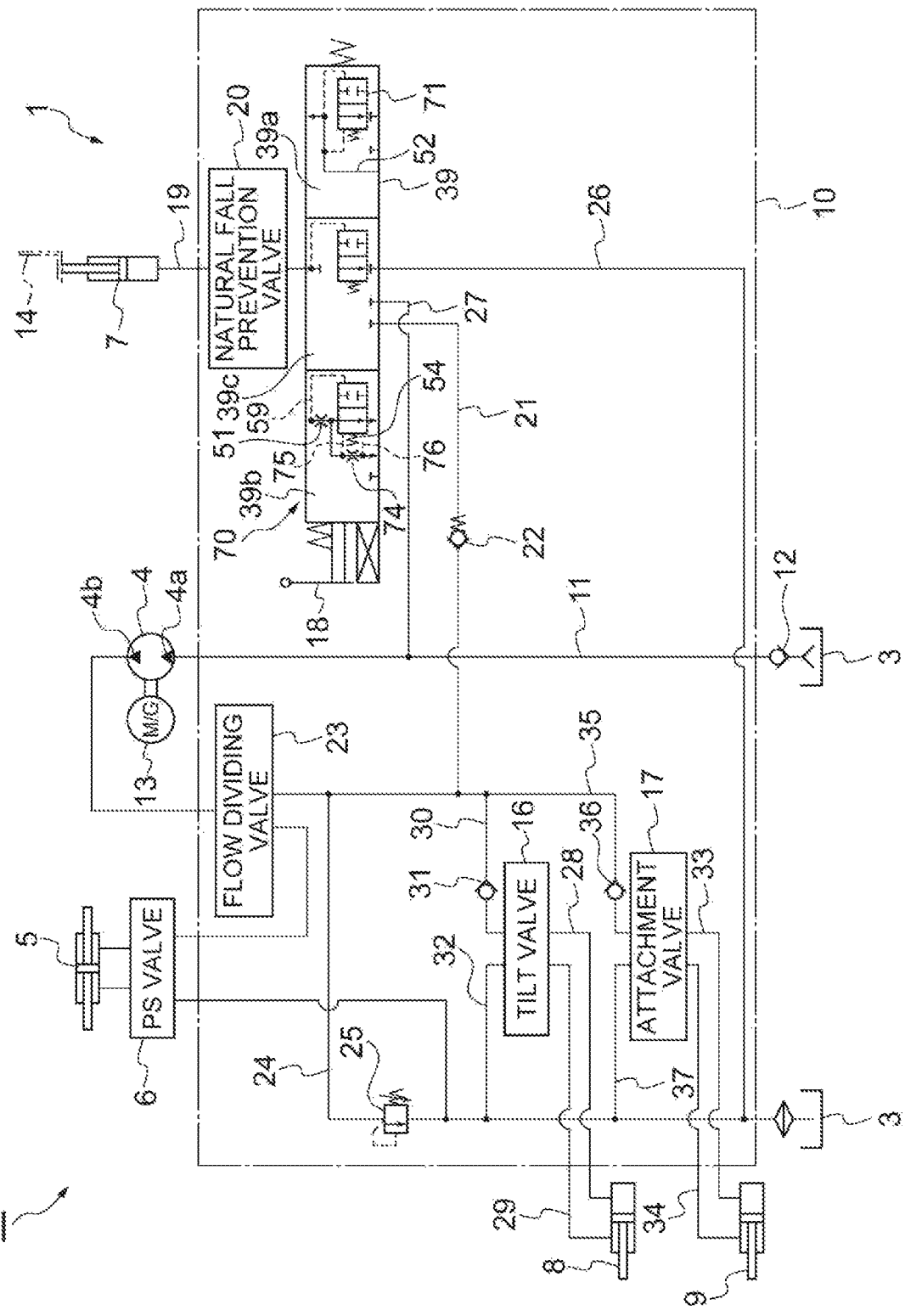
FIG. 3 is a hydraulic circuit diagram illustrating a hydraulic driving device of an industrial vehicle according to a second embodiment.

FIG. 3 is a hydraulic circuit diagram illustrating a hydraulic driving device of an industrial vehicle according to a second embodiment. In FIG. 3, the hydraulic driving device 1 of the present embodiment includes a lift valve 70 instead of the lift valve 15 of the above-described first embodiment.

Figure 4:
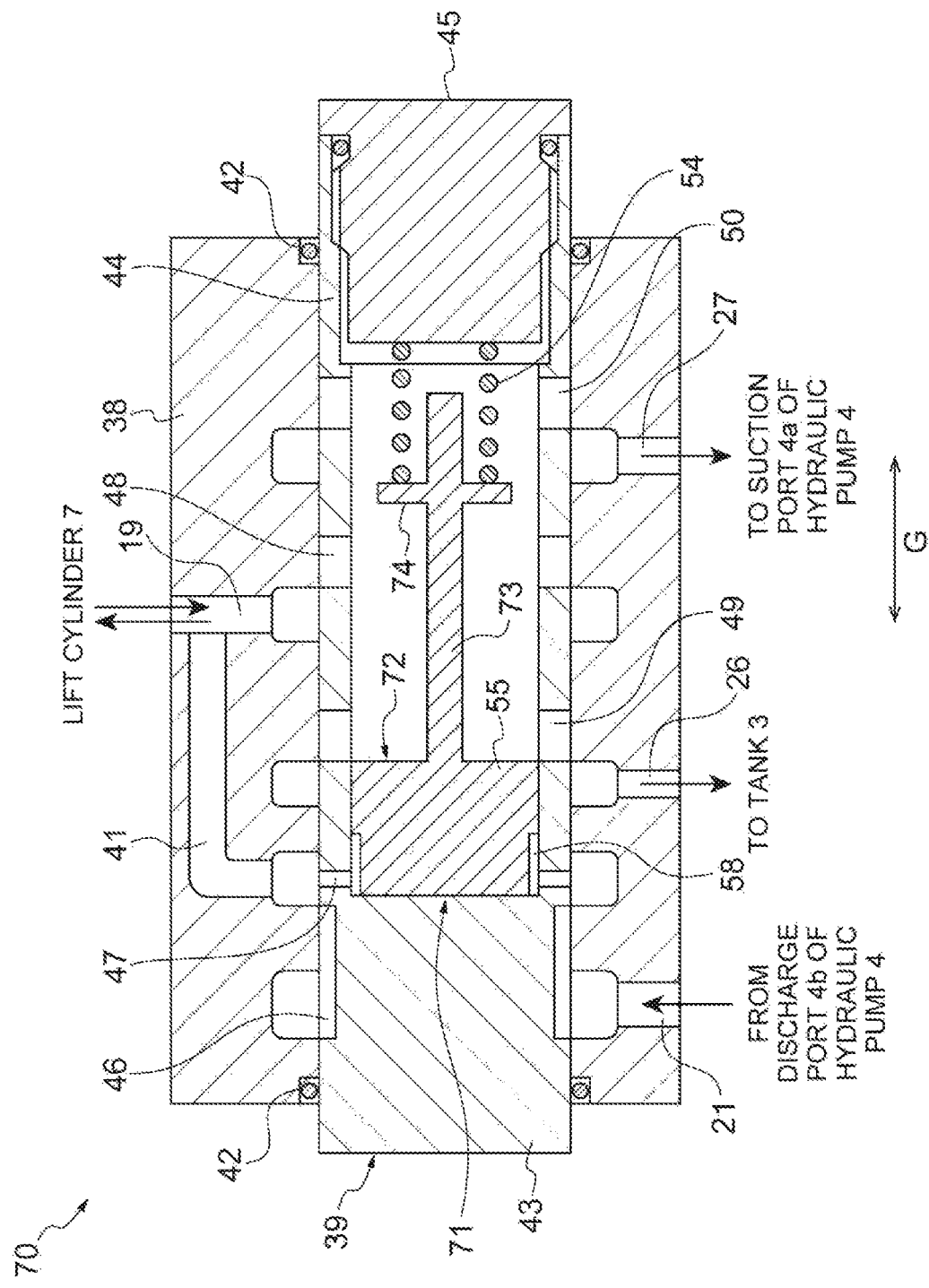
FIG. 4 is a cross-sectional view of a lift valve illustrated in FIG. 3.

FIG. 4 is a cross-sectional view of the lift valve 70. In FIGS. 3 and 4, the lift valve 70 includes the body 38 and the main spool 39 and also includes a flow regulator 71 disposed inside the main spool 39. The flow regulator 71 includes a flow regulator spool 72 which is movable in the movement direction of the main spool 39 with respect to the main spool 39 and the above-described spring 54.

The flow regulator spool 72 includes the above-described sliding portion 55 and a columnar rod portion 73 which extends from the sliding portion 55 toward the plug 45. A flange-shaped resistance component 74 protrudes from the peripheral surface of the rod portion 73. The flange-shaped resistance component 74 generates pressure loss in the hydraulic oil flowing inside the main spool 39 from the hydraulic oil passage 19 to the hydraulic oil passage 27. The flange-shaped resistance component 74 is disposed between the communication ports 48 and 50. The spring 54 is disposed between the flange-shaped resistance component 74 and the plug 45. The flange-shaped resistance component 74 receives the spring 54. For this reason, the diameter of the flange-shaped resistance component 74 is larger than the diameter of the spring 54.

A space between the sliding portion 55 and the flange-shaped resistance component 74 inside the main spool 39, that is, an upstream space of the flange-shaped resistance component 74 inside the main spool 39 constitutes a pilot passage 75 (see FIG. 3) which is a second pilot passage applying a pressure to the opening side of the flow regulator spool 72 (the left side of FIG. 4) when the hydraulic oil flows from the lift cylinder 7 to the tank 3. A space between the flange-shaped resistance component 74 and the plug 45 inside the main spool 39, that is, a downstream space of the flange-shaped resistance component 74 inside the main spool 39 constitutes a pilot passage 76 (see FIG. 3) which is a second pilot passage applying a pressure to the opening side of the flow regulator spool 72 when the hydraulic oil flows from the lift cylinder 7 to the tank 3.

Figure 5:
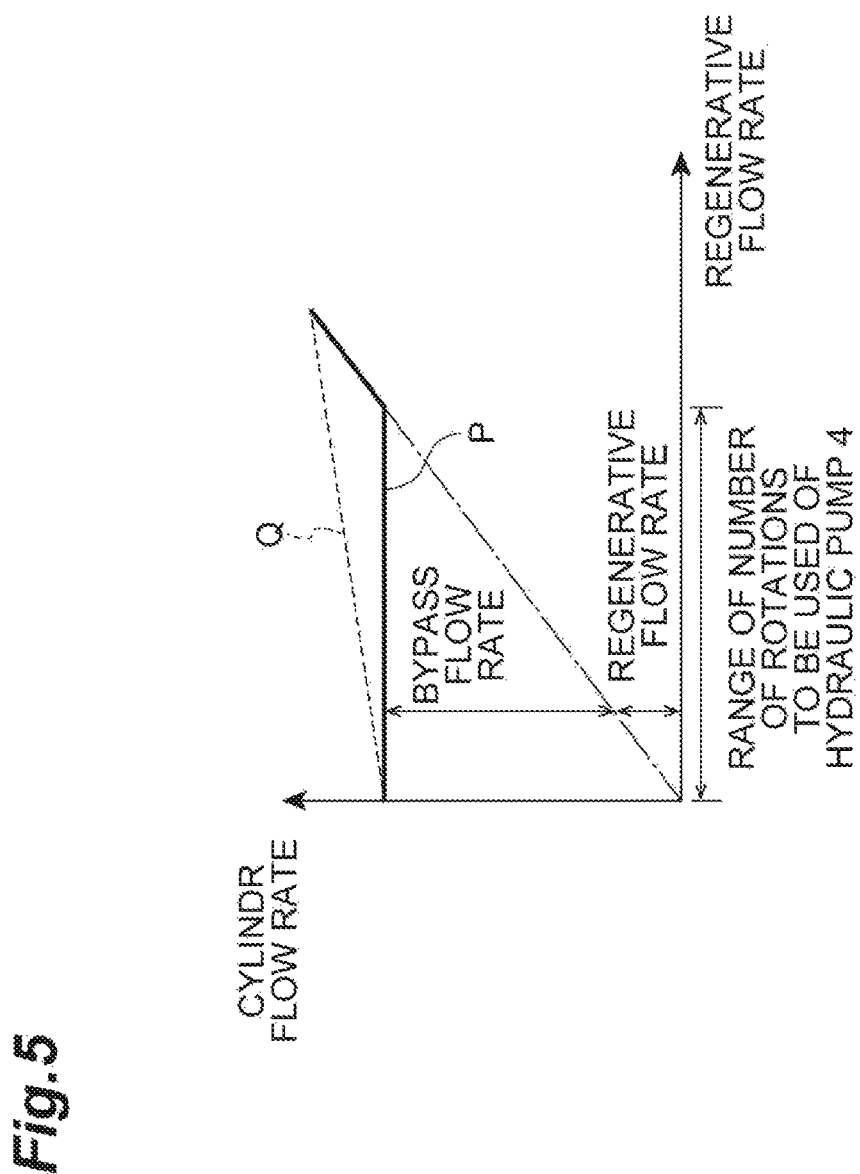
FIG. 5 is a graph showing a relationship between a regenerative flow rate and a cylinder flow rate.

Incidentally, in the above-described first embodiment, when the main spool 39 is moved toward the full open position 39b (the left side of FIG. 2) by the lift operation lever 18 so that the flow rate (the regenerative flow rate) of the hydraulic oil flowing in the hydraulic oil passage 27 increases, a pressure applied to the opening side of the flow regulator spool 53 does not decrease and hence the flow regulator spool 53 is not easily closed. For this reason, the flow rate (the bypass flow rate) of the hydraulic oil flowing in the hydraulic oil passage 26 does not easily decrease even when the regenerative flow rate increases. Thus, the cylinder flow rate (the flow rate of the hydraulic oil flowing in the hydraulic oil passage 19) which is the sum of the regenerative flow rate and the bypass flow rate increases in accordance with an increase in the regenerative flow rate as indicated by a dashed line Q of FIG. 5. Additionally, FIG. 5 is a graph showing a relationship between the regenerative flow rate and the cylinder flow rate.

Meanwhile, in the present embodiment, pressure loss is generated in response to the flow rate of the hydraulic oil flowing from the hydraulic oil passage 19 to the hydraulic oil passage 27 due to the flange-shaped resistance component 74. Thus, since the pressure of the pilot passage 76 decreases due to the flange-shaped resistance component 74 so that a total pressure applied to the opening side of the flow regulator spool 72 decreases as the flow rate of the hydraulic oil flowing from the hydraulic oil passage 19 to the hydraulic oil passage 27 increases, the flow regulator spool 72 is easily closed. For this reason, since the bypass flow rate decreases even when the regenerative flow rate increases in the range of the number of rotations to be used by the hydraulic pump 4, the cylinder flow rate which is the sum of the regenerative flow rate and the bypass flow rate can be maintained constant as indicated by a solid line P of FIG. 5. Accordingly, since the shortening speed of the lift cylinder 7 can be maintained constant, for example, even when the control of changing the number of rotations of the hydraulic pump 4 is performed in order to operate the tilt cylinder 8 while the fork 14 is lowered, the lowering speed of the fork 14 can be maintained constant.

Further, in the present embodiment, since the flow regulator spool 72 is provided with the flange-shaped resistance component 74, there is no need to provide the resistance component in the main spool 39 and to perform unnecessary processing on the existing main spool 39.

Further, in the present embodiment, the flange-shaped resistance component 74 has a function of receiving the spring 54 as well as a function of generating pressure loss in the hydraulic oil flowing from the hydraulic oil passage 19 to the hydraulic oil passage 27. For this reason, a portion that receives the spring 54 may not be separately provided in the flow regulator spool 72. Accordingly, a structure of the flow regulator 71 can be simplified.

Figure 6:
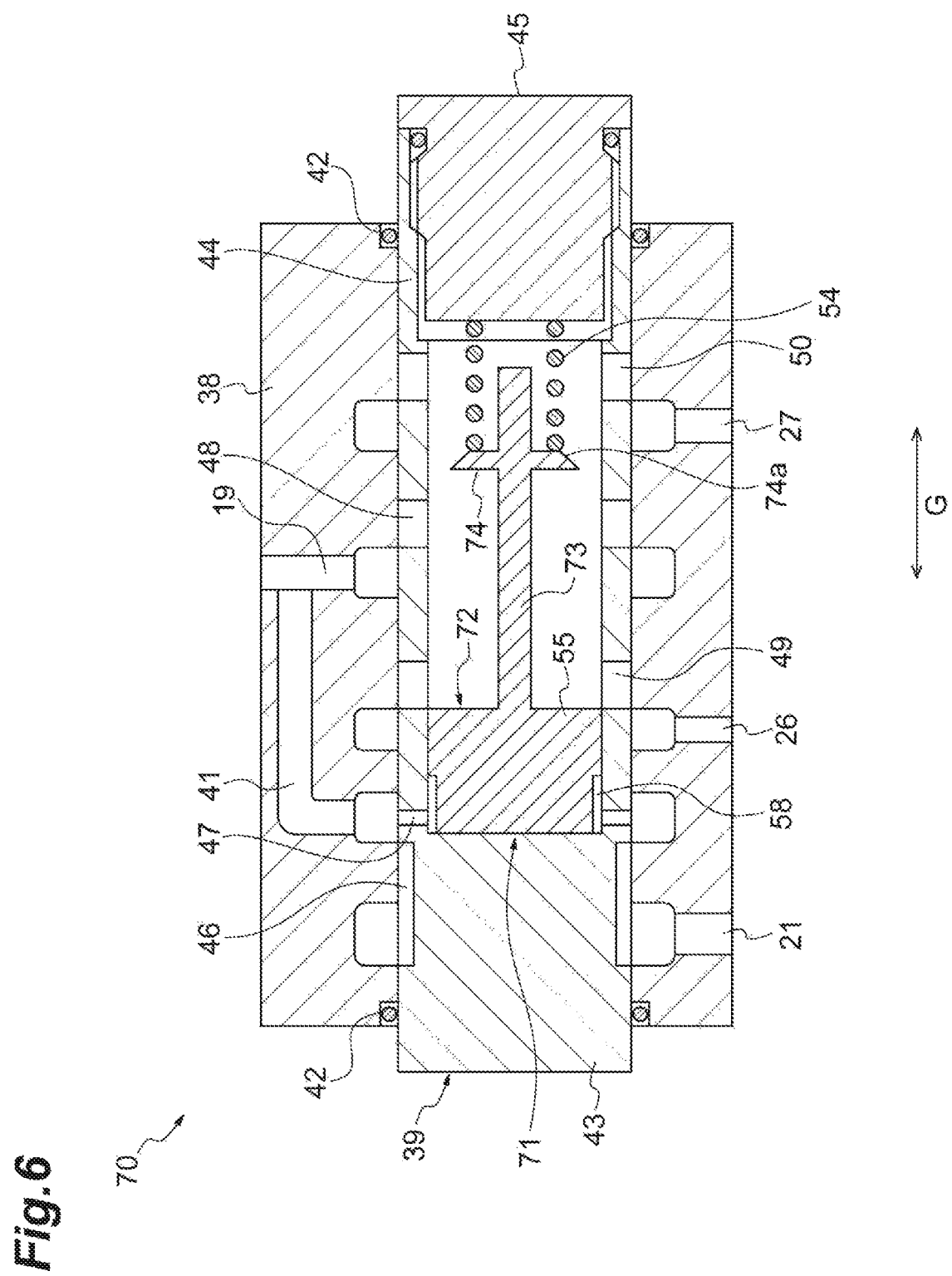
FIG. 6 is a cross-sectional view illustrating a modified example of the lift valve illustrated in FIG. 4 and is a diagram corresponding to FIG. 4.

FIG. 6 is a cross-sectional view illustrating a modified example of the lift valve 70 illustrated in FIG. 4 and is a diagram corresponding to FIG. 4. In FIG. 6, the lift valve 70 of the present modified example is different from that of the above-described second embodiment only in the structure of the flange-shaped resistance component 74 of the flow regulator spool 72. An outer peripheral edge 74a of the flange-shaped resistance component 74 is formed in a knife edge shape which is tapered from the sliding portion 55 toward the spring 54. Additionally, the knife edge shape of the outer peripheral edge 74a of the flange-shaped resistance component 74 is not particularly limited thereto.

In the present modified example, it is possible to prevent a problem in which the hydraulic oil is difficult to flow between the flange-shaped resistance component 74 and the main spool 39 even when the viscosity of the hydraulic oil increases due to a decrease in temperature of the hydraulic oil. Thus, it is possible to prevent a problem in which the flow rate characteristics of the hydraulic oil flowing in the hydraulic oil passage 19 (the cylinder flow rate characteristics) change due to a change in temperature of the hydraulic oil.

Figure 7:
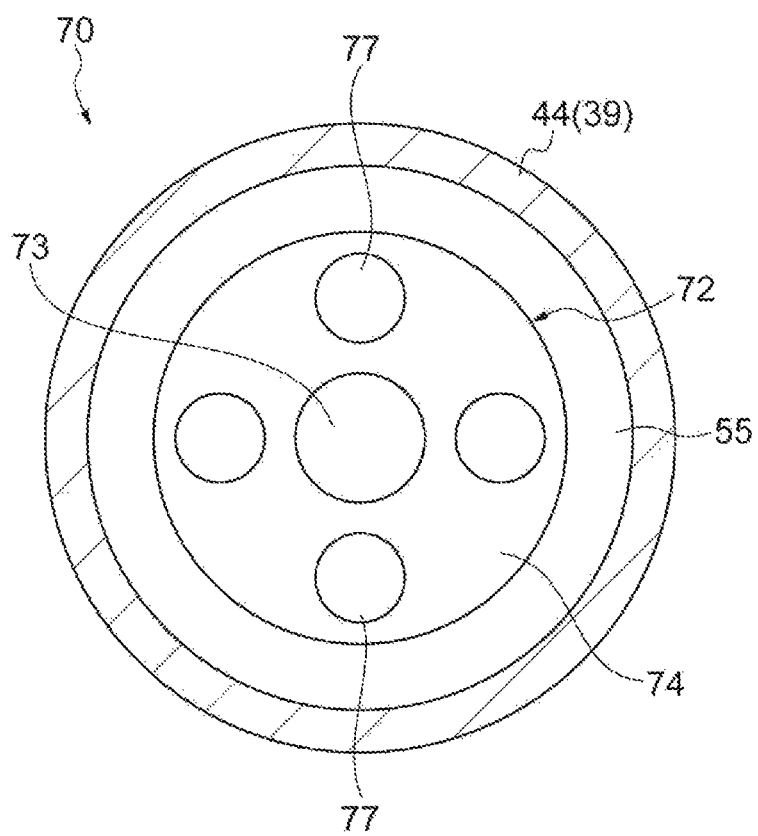
FIG. 7 is a cross-sectional view illustrating another modified example of the lift valve illustrated in FIG. 4.

FIG. 7 is a cross-sectional view illustrating another modified example of the lift valve 70 illustrated in FIG. 4. FIG. 7 is a cross-sectional view when the flow regulator spool 72 is viewed from the plug 45. Additionally, in FIG. 7, the body 38 and the spring 54 are omitted. In FIG. 7, the lift valve 70 of the present modified example is also different from that of the above-described second embodiment only in the structure of the flange-shaped resistance component 74 of the flow regulator spool 72.

In the flange-shaped resistance component 74, a plurality of (here, four) through-holes 77 each having a circular cross-sectional shape and penetrating in the movement direction of the main spool 39 are provided at the same intervals in the circumferential direction of the flange-shaped resistance component 74. Additionally, the number, the dimension, and the shape of the through-hole 77 are not particularly limited.

In the present modified example, since the flow rate of the hydraulic oil passing through the flange-shaped resistance component 74 changes when the number or dimension of the through-hole 77 is changed, a pressure applied to the opening side of the flow regulator spool 72 changes and the closed state of the flow regulator spool 72 changes. Thus, the cylinder flow rate characteristics can be adjusted by adjusting the number or dimension of the through-hole 77. Accordingly, the cylinder flow rate can be reliably maintained constant.

Figure 8:
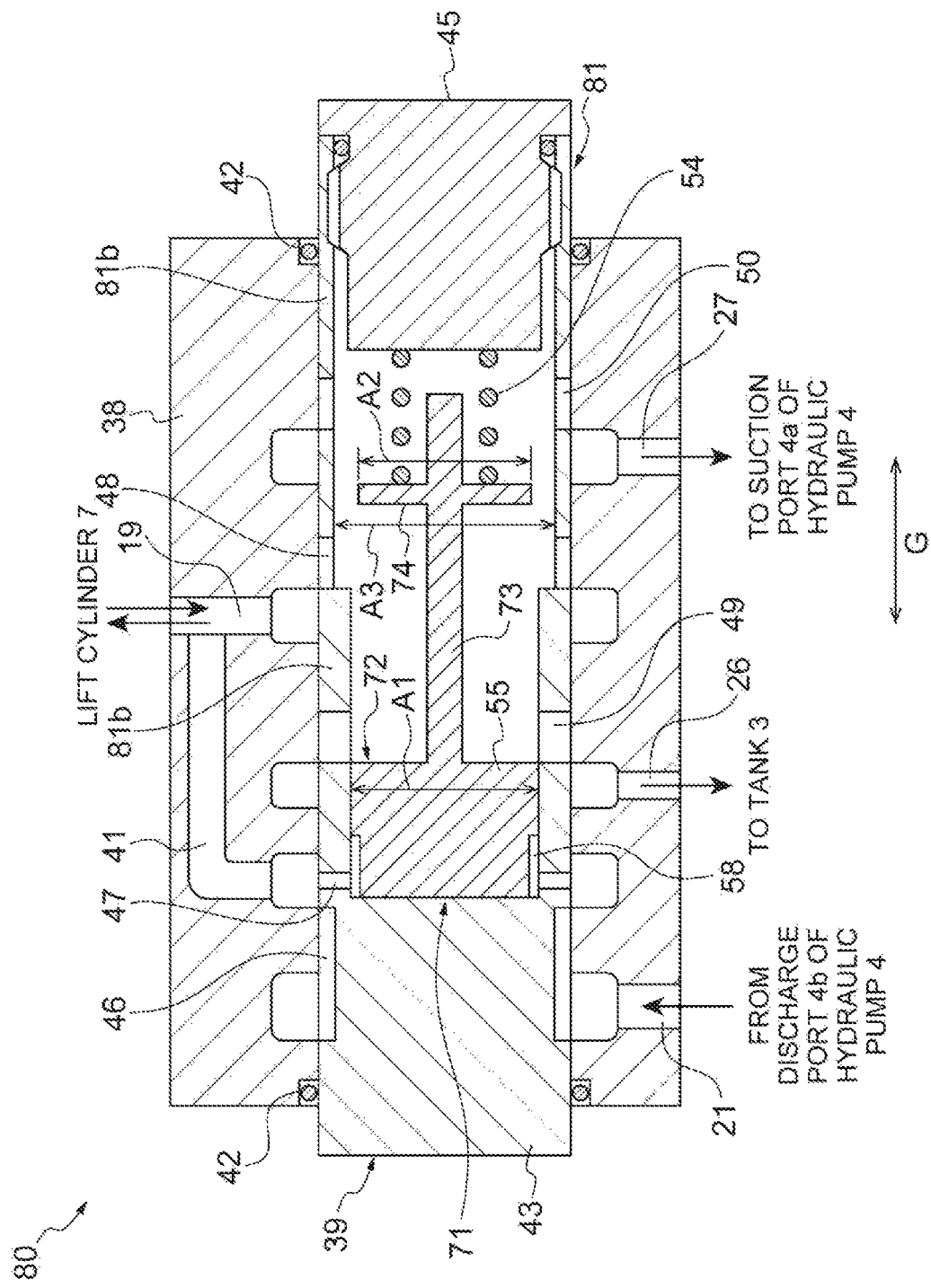
FIG. 8 is a cross-sectional view illustrating a lift valve of a hydraulic driving device of an industrial vehicle according to a third embodiment.

FIG. 8 is a cross-sectional view illustrating a lift valve of a hydraulic driving device of an industrial vehicle according to a third embodiment of the present disclosure. In FIG. 8, the hydraulic driving device 1 of the present embodiment includes a lift valve 80 instead of the lift valve 70 of the above-described second embodiment. The lift valve 80 includes the main spool 39 and the flow regulator 71 similarly to the above-described second embodiment.

The main spool 39 includes the above-described base portion 43 and a cylindrical portion 81 extending from the base portion 43 in the axial direction (the direction G). A front end portion of the cylindrical portion 81 is blocked by the plug 45. The cylindrical portion 81 includes a sliding portion region 81a which is located on the side of the base portion 43 and corresponds to the sliding portion 55 of the flow regulator spool 72 and a resistance component region 81b which is located on the side of the plug 45 and corresponds to the flange-shaped resistance component 74 of the flow regulator spool 72.

The thickness of the resistance component region 81b is smaller than the thickness of the sliding portion region 81a. For this reason, the inner diameter $A_3$ of the resistance component region 81b is larger than the inner diameter $A_1$ of the sliding portion region 81a. Accordingly, the diameter $A_2$ of the flange-shaped resistance component 74 becomes larger than that of the above-described second embodiment. For example, the diameter $A_2$ of the flange-shaped resistance component 74 may be larger than the inner diameter $A_1$ of the sliding portion region.

Figure 9:
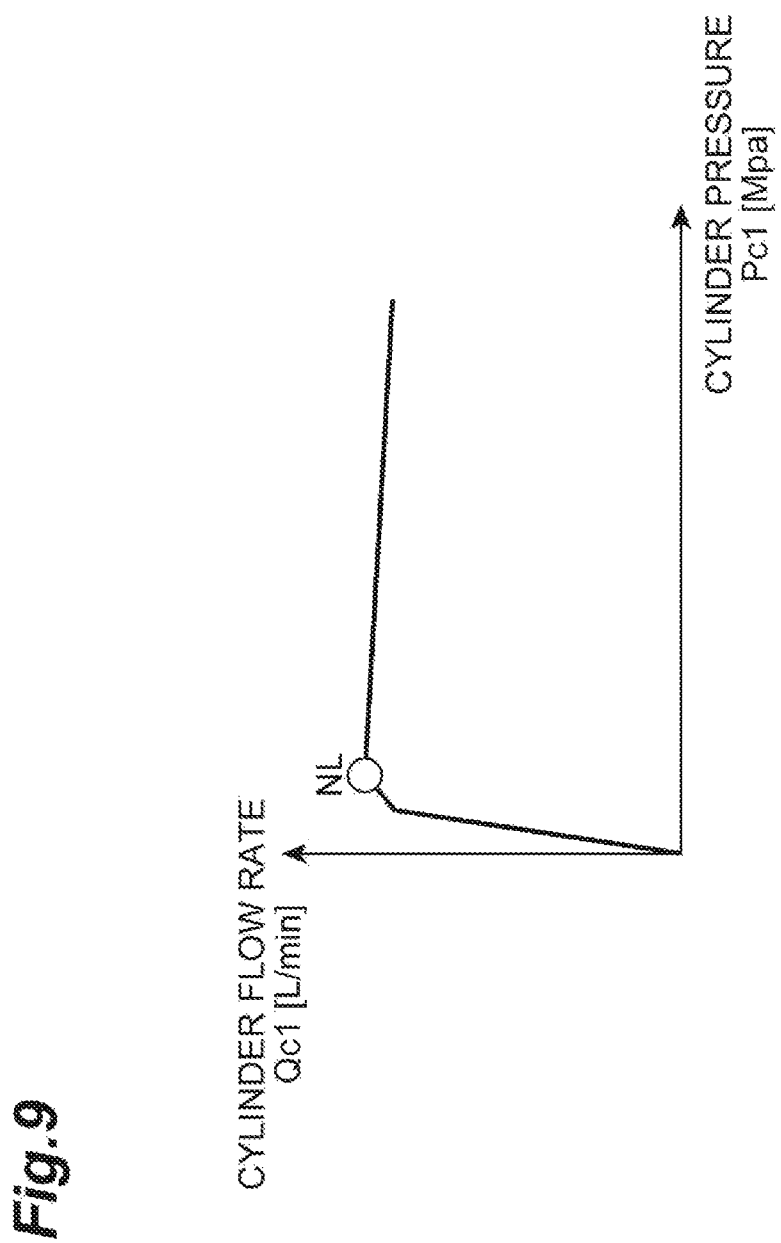
FIG. 9 is a graph showing a relationship between a cylinder pressure and a cylinder flow rate.

Here, characteristics necessary for the cargo handling valve unit 10 are as below. That is, a sufficient lowering speed of the fork 14 needs to be first ensured also in a state in which no cargo exists on the fork 14 (no load). FIG. 9 is a graph showing a relationship between the cylinder flow rate and the pressure (the cylinder pressure) of the bottom chamber of the lift cylinder 7. Specifically, in the case of no load, the cylinder flow rate indicated by an operation point NL in FIG. 9 is necessary.

Figure 10:
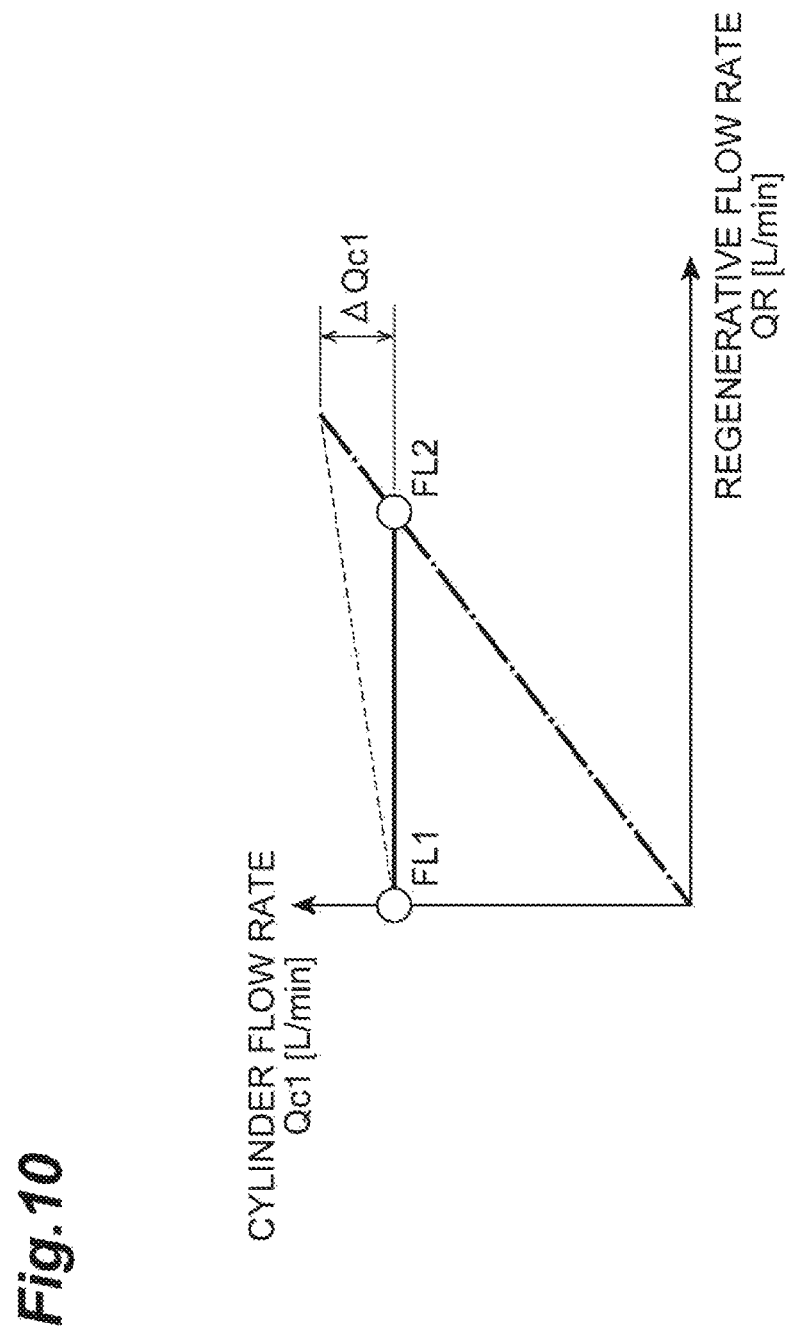
FIG. 10 is a graph showing a relationship between a regenerative flow rate and a cylinder flow rate.

Further, there is a need to ensure the sufficient lowering speed of the fork 14 also in a state in which a cargo of a maximum load exists on the fork 14 (a full load state) and the hydraulic pump 4 is stopped. FIG. 10 is a graph showing a relationship between the regenerative flow rate and the cylinder flow rate and corresponds to FIG. 5. In the case of the full load and the stop of the hydraulic pump 4, the cylinder flow rate indicated by an operation point FL1 in FIG. 10 is necessary.

Further, also in the case of the full load and the rotation of the hydraulic pump 4, the lowering speed which is substantially the same as the above-described operation point FL1 needs to be ensured. In the case of the full load and the rotation of the hydraulic pump 4, the cylinder flow rate indicated by an operation point FL2 in FIG. 10 is necessary.

Figure 11:
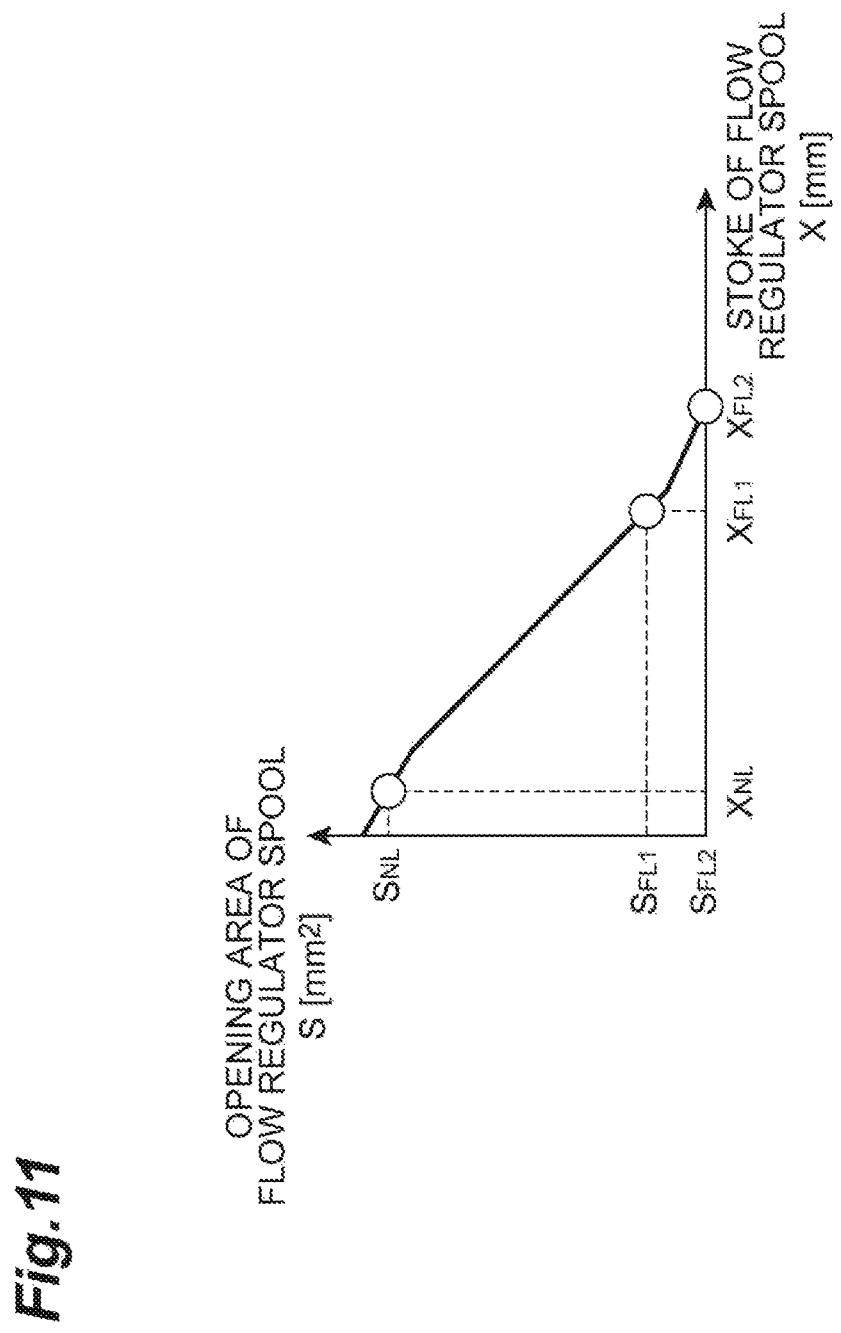
FIG. 11 is a graph showing a relationship between a stroke of a flow regulator spool and an opening area of the flow regulator spool.

The opening area of the flow regulator spool 72 necessary to meet the above-described condition is obtained as shown in FIG. 11. FIG. 11 is a graph showing a relationship between the stroke of the flow regulator spool 72 and the opening area of the flow regulator spool 72. Additionally, the opening area of the flow regulator spool 72 is specifically the opening area of the communication port 49 of the main spool 39.

Since the cylinder pressure is low in the case of no load, there is a need to increase the opening area S of the flow regulator spool 72 by decreasing the stroke X of the flow regulator spool 72 ($S_{NL}$ in FIG. 11). Since the cylinder pressure is high in the case of a full load and the stop of the hydraulic pump 4, the opening area S of the flow regulator spool 72 may be decreased by increasing the stroke X of the flow regulator spool 72 ($S_{FL1}$ in FIG. 11). In the case of the full load and the rotation of the hydraulic pump 4, the flow regulator spool 72 may be fully closed by increasing the stroke X of the flow regulator spool 72 ($S_{FL2}$ in FIG. 11).

Incidentally, when the flange-shaped resistance component 74 is not provided in the flow regulator spool 72, the bypass flow rate does not easily decrease even when the regenerative flow rate increases as described above and hence the cylinder flow rate increases in accordance with an increase in the regenerative flow rate. As a result, as shown in FIG. 10, a cylinder flow rate deviation $\Delta Q_{c1}$ is generated. In this case, when the number of rotations of the hydraulic pump 4 is changed in order to perform another cargo handling operation while the fork 14 is lowered, the lowering speed of the fork 14 changes and thus an operator feels uncomfortable.

In the present embodiment, the flow regulator spool 72 is provided with the flange-shaped resistance component 74. For this reason, since pressure loss is generated in the hydraulic oil flowing inside the main spool 39 due to the flange-shaped resistance component 74, a pressure applied to the flow regulator spool 72 is optimized and the cylinder flow rate deviation $\Delta Q_{c1}$ is decreased. However, when the pressure loss necessary for the flange-shaped resistance component 74 is large, the regeneration efficiency of the hydraulic pump 4 is deteriorated.

Here, when pressure loss $\Delta P_{Rori}$ necessary for the flange-shaped resistance component 74 is derived from a balancing force between the pressure receiving area of the flow regulator spool 72 and the spring force of the spring 54, the pressure loss is expressed by the following equation.

$$\Delta P_{Rori} = \frac{k(x_{FL2} + x_0) - \Delta P_{mainFL2} \cdot A_1}{A_2} = \qquad \text{[Math. 1]}$$

$$\frac{\{A_1(\Delta P_{mainFL1} - \Delta P_{mainNL}) + (F_{jetFL1} - F_{jetNL})\}\frac{x_{FL2} - x_{NL}}{x_{FL1} - x_{NL}} + A_1(\Delta P_{mainNL} - \Delta P_{mainFL2}) + F_{jetNL}}{A_2}$$

k: spring constant of spring
$x_0$: initial deflection of spring
$x_{NL}$: stroke of flow regulator spool in case of no load
$x_{FL1}$: stroke of flow regulator spool in case of full load and stop of hydraulic pump
$x_{FL2}$: stroke of flow regulator spool in case of full load and rotation of hydraulic pump
$A_1$: pressure receiving area 1 of flow regulator spool (inner diameter of sliding portion region of main spool)
$A_2$: pressure receiving area 2 of flow regulator spool (diameter of flange-shaped resistance component of flow regulator spool)
$\Delta P_{mainNL}$: pressure loss of main spool in case of no load
$\Delta P_{mainFL1}$: pressure loss of main spool in case of full load and stop of hydraulic pump
$\Delta P_{mainFL2}$: pressure loss of main spool in case of full load and rotation of hydraulic pump
$F_{jetNL}$: fluid force of flow regulator in case of no load
$F_{jetFL1}$: fluid force of flow regulator in case of full load and stop of hydraulic pump In the present embodiment, since the inner diameter $A_3$ of the resistance component region 81*b* in the cylindrical portion 81 of the main spool 39 is larger than the inner diameter $A_1$ of the sliding portion region 81*a*, the diameter $A_2$ of the flange-shaped resistance component 74 can be increased to that extent. When the diameter $A_2$ of the flange-shaped resistance component 74 is set to be large, the pressure loss $\Delta P_{Rori}$ necessary for the flange-shaped resistance component 74 decreases by the above-described equation. For this reason, it is possible to decrease the cylinder flow rate deviation $\Delta_{Qc1}$ while improving the regeneration efficiency of the hydraulic pump 4. Accordingly, the lowering speed of the fork 14 can be maintained constant even when the number of rotations of the hydraulic pump 4 is changed in order to perform another cargo handling operation while the fork 14 is lowered. As a result, the uncomfortable feeling of the operator can be prevented.

Further, the present disclosure is not limited to the above-described embodiment. For example, in the above-described second and third embodiments, the flange-shaped resistance component 74 provided in the flow regulator spool 72 has a function of generating pressure loss in the hydraulic oil flowing from the hydraulic oil passage 19 to the hydraulic oil passage 27 and a function of receiving the spring force of the spring 54, but the type is not particularly limited. For example, the flow regulator spool may include two sliding portions and a rod portion connecting the sliding portions to each other, the spring force of the spring may be received by one sliding portion, and the flange-shaped resistance component may be provided on the peripheral surface of the rod portion.

Further, in the above-described second and third embodiments, the flow regulator spool 72 is provided with the flange-shaped resistance component 74, but the resistance component for generating pressure loss in the hydraulic oil flowing from the hydraulic oil passage 19 to the hydraulic oil passage 27 is not particularly limited to that type. For example, a protrusion or the like provided on the inner peripheral surface of the main spool 39 may be used.

Further, in the above-described embodiment, the lift valve is a manual direction switching valve in which the lift operation lever 18 is mechanically connected to the main spool 39, but the lift valve is not particularly limited to that type. For example, an electromagnetic pilot type direction switching valve may be used.

Figure 12:
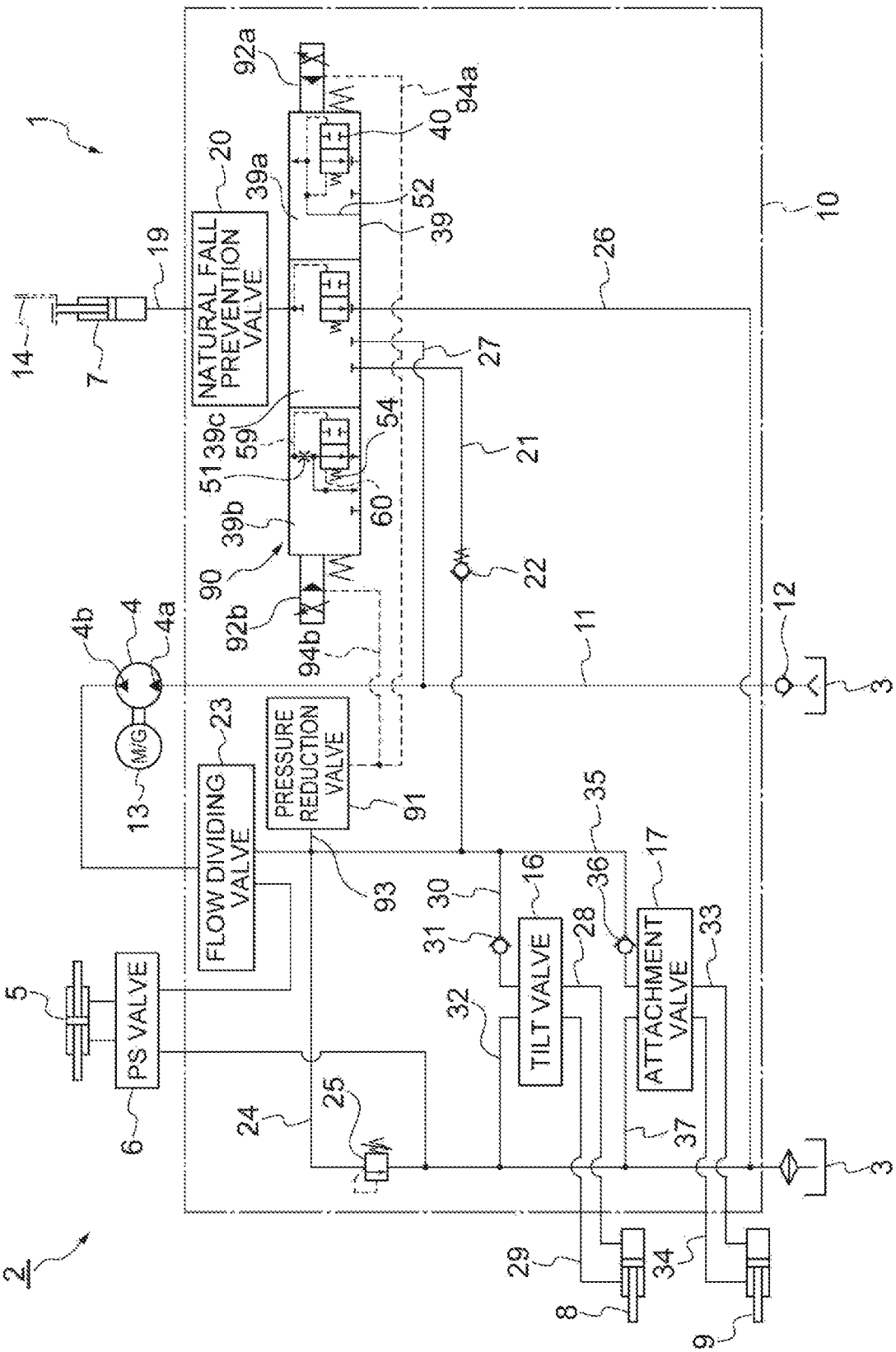
FIG. 12 is a hydraulic circuit diagram illustrating a modified example of the hydraulic driving device illustrated in FIG. 1.

FIG. 12 is a hydraulic circuit diagram illustrating a hydraulic driving device including an electromagnetic pilot type lift valve as a modified example of the hydraulic driving device illustrated in FIG. 1. In FIG. 12, the cargo handling valve unit 10 of the hydraulic driving device 1 of the present modified example includes an electromagnetic pilot type lift valve 90 and a pressure reduction valve 91.

The lift valve 90 includes electromagnetic pilot operation portions 92*a* and 92*b* which are respectively provided on the side of the full open positions 39*a* and 39*b* of the main spool 39. An electrical signal corresponding to an operation state of a lift operation lever (not illustrated) is input from a controller (not illustrated) to the electromagnetic pilot operation portions 92*a* and 92*b*.

The pressure reduction valve 91 is connected to the hydraulic oil passage 21 through the hydraulic oil passage 93. The pressure reduction valve 91 is a valve which generates a constant pressure by decreasing the pressure of the hydraulic oil flowing in the hydraulic oil passage 21. The pressure reduction valve 91 is connected to each of the electromagnetic pilot operation portions 92*a* and 92*b* through the pilot passages 94*a* and 94*b*. A pilot pressure corresponding to an operation state of a lift operation lever (not illustrated) is applied to the main spool 39.

Further, in the above-described embodiment, the cargo handling regeneration of the hydraulic pump 4 is performed, but the present disclosure can be also applied to a cargo handling control valve unit without a cargo handling regeneration function.

Figure 13:
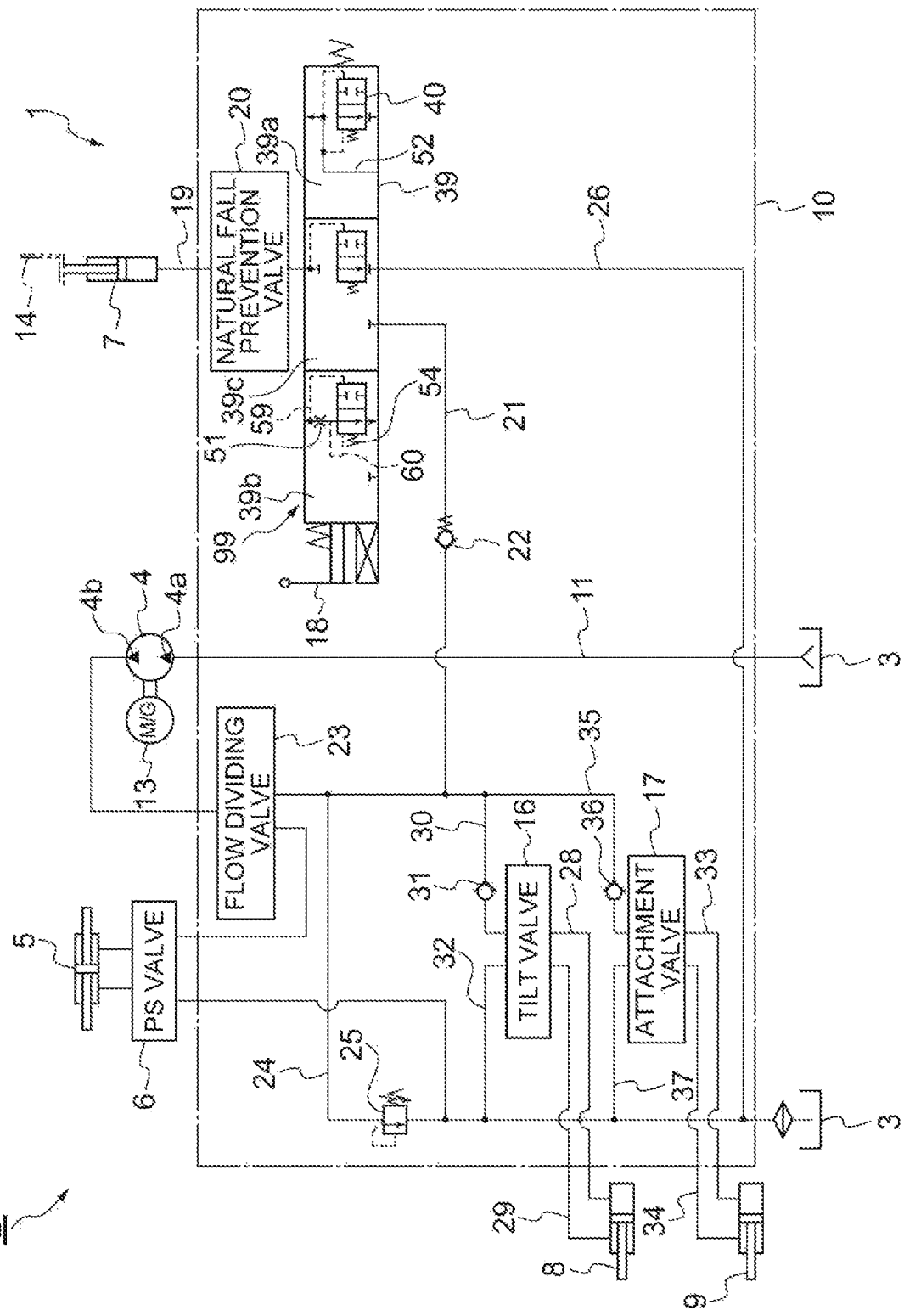
FIG. 13 is a hydraulic circuit diagram illustrating another modified example of the hydraulic driving device illustrated in FIG. 1.
Figure 14:
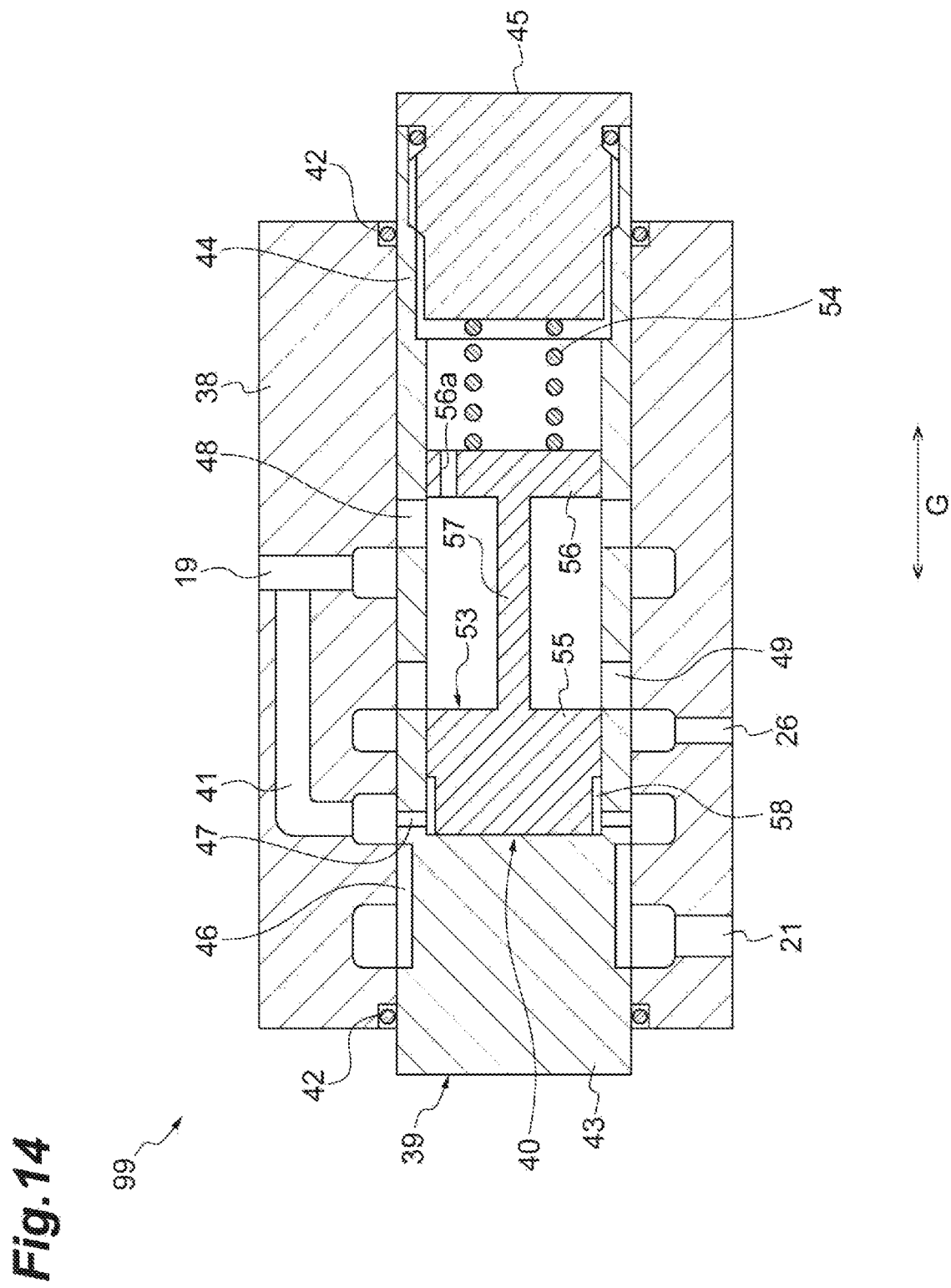
FIG. 14 is a cross-sectional view of a lift valve illustrated in FIG. 13.

FIG. 13 is a hydraulic circuit diagram illustrating a hydraulic driving device including a cargo handling control valve unit without a cargo handling regeneration function as another modified example of the hydraulic driving device illustrated in FIG. 1. In FIG. 13, the cargo handling valve unit 10 of the hydraulic driving device 1 of the present modified example includes a lift valve 99. The lift valve 99 and the suction port 4*a* of the hydraulic pump 4 are not connected to each other through the above-described hydraulic oil passage 27. The main spool 39 of the lift valve 99 is provided with the communication ports 47 to 49 as illustrated in FIG. 14, but the above-described communication port 50 communicating the hydraulic oil passage 27 with the inside of the main spool 39 is not provided. Also in this case, since the flow regulator 40 is built in the main spool 39, it is possible to realize space saving and low cost of the cargo handling valve unit 10.

Further, in the above-described embodiment, the lift valve including the main spool and the flow regulator is disposed among the hydraulic pump 4, the tank 3, and the lift cylinder 7, but the present disclosure can be also applied to an industrial vehicle other than the forklift in which the direction switching valve is disposed among the hydraulic pump, the tank, and the hydraulic cylinder.

Figure 15:
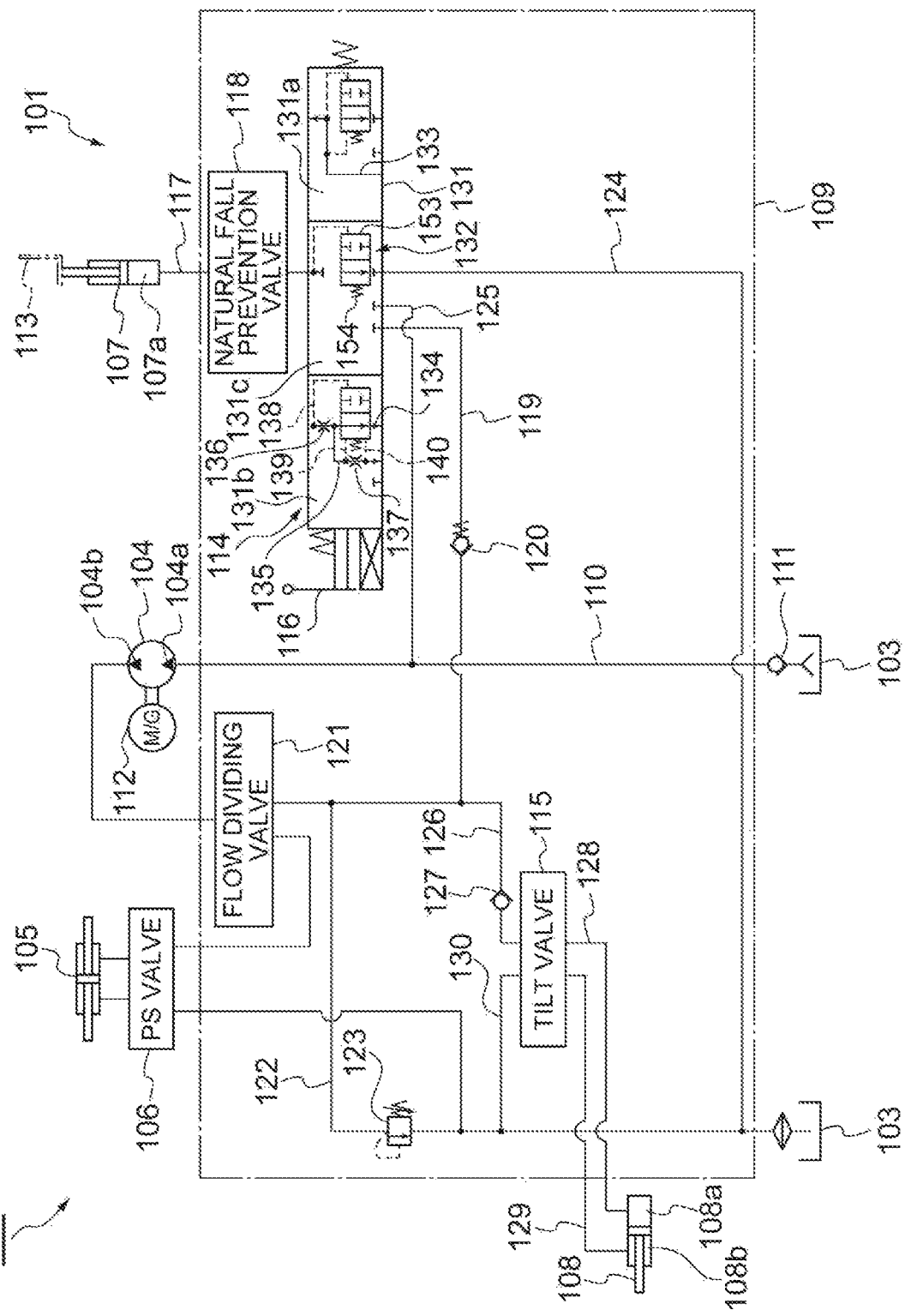
FIG. 15 is a hydraulic circuit diagram illustrating a hydraulic driving device of an industrial vehicle according to an embodiment.

FIG. 15 is a hydraulic circuit diagram illustrating a hydraulic driving device of an industrial vehicle according to an embodiment. In FIG. 15, a hydraulic driving device 101 of the present embodiment is mounted on a forklift 102 which is an industrial vehicle.

The hydraulic driving device 101 includes a tank 103, a hydraulic pump 104, a PS cylinder 105 (a power steering cylinder), a PS valve 106 (a power steering valve), a lift cylinder 107, a tilt cylinder 108, and a cargo handling valve unit 109.

The tank 103 stores hydraulic oil. The hydraulic pump 104 includes a suction port 104*a* which sucks the hydraulic oil and a discharge port 104*b* which discharges the hydraulic oil. The suction port 104*a* is connected to the tank 103 through a suction passage 110. A check valve 111 which allows only the flow of the hydraulic oil from the tank 103 to the hydraulic pump 104 is disposed in the suction passage 110. The hydraulic pump 104 is driven by a motor 112.

The PS cylinder 105 is a double rod type hydraulic cylinder which is driven by the hydraulic oil discharged from the discharge port 104*b* of the hydraulic pump 104. The PS valve 106 is a direction switching valve which is disposed among the hydraulic pump 104, the tank 103, and the PS cylinder 105 and switches a hydraulic oil flow direction in response to an operation state of a handle (not illustrated).

The lift cylinder 107 is a hydraulic cylinder which is driven by the hydraulic oil discharged from the discharge port 104*b* of the hydraulic pump 104 and elevates the fork 113. The tilt cylinder 108 is a hydraulic cylinder which is driven by the hydraulic oil discharged from the discharge port 104*b* of the hydraulic pump 104 and tilts a mast (not illustrated).

The cargo handling valve unit 109 includes a lift valve 114 which is disposed among the hydraulic pump 104, the tank 103, and the lift cylinder 107 and a tilt valve 115 which is disposed among the hydraulic pump 104, the tank 103, and the tilt cylinder 108.

The lift valve 114 is a direction switching valve which switches a hydraulic oil flow direction in response to an operation state of a lift operation lever 116. The lift operation lever 116 is operation means for elevating the fork 113 by lengthening and shortening the lift cylinder 107. The lift valve 114 will be described later. The tilt valve 115 is a direction switching valve which switches a hydraulic oil flow direction in response to an operation state of a tilt operation lever (not illustrated).

A bottom chamber 107a of the lift cylinder 107 is connected to the lift valve 114 through a common passage 117. The common passage 117 is a passage in which the hydraulic oil flows in both directions between the lift valve 114 and the lift cylinder 107. A natural fall prevention valve 118 is disposed in the common passage 117. The natural fall prevention valve 118 is a valve which prevents a natural fall of the fork 113 in such a manner that the lift cylinder 107 is naturally shortened.

The discharge port 104b of the hydraulic pump 104 is connected to the lift valve 114 through a supply passage 119. The supply passage 119 is a passage in which the hydraulic oil flows from the hydraulic pump 104 to the lift valve 114. A check valve 120 which allows only the flow of the hydraulic oil from the hydraulic pump 104 to the lift valve 114 is disposed in the supply passage 119. A flow dividing valve 121 is disposed between the hydraulic pump 104 and the check valve 120 in the supply passage 119. The flow dividing valve 121 is a valve which divides the hydraulic oil from the hydraulic pump 104 to the PS side (the side of the PS cylinder 105) and the cargo handling side (the side of the lift cylinder 107 and the tilt cylinder 108).

A portion between the check valve 120 and the flow dividing valve 121 in the supply passage 119 is connected to the tank 103 through the discharge passage 122. A relief valve 123 which is opened when a pressure of the discharge passage 122 becomes a set pressure or more is disposed in the discharge passage 122.

The lift valve 114 and the tank 103 are connected to each other through discharge passages 124 and 122. The discharge passage 124 is a passage in which the hydraulic oil flows from the lift valve 114 to the tank 103. The lift valve 114 and the suction port 104a of the hydraulic pump 104 are connected to each other through a regeneration passage 125 and the suction passage 110. The regeneration passage 125 is a passage in which the hydraulic oil flows from the lift valve 114 to the suction port 104a of the hydraulic pump 104.

A portion between the check valve 120 and the flow dividing valve 121 in the supply passage 119 is connected to the tilt valve 115 through a supply passage 126. A check valve 127 which allows only the flow of the hydraulic oil from the flow dividing valve 121 to the tilt valve 115 is disposed in the supply passage 126. The tilt valve 115 is connected to a bottom chamber 108a and a rod chamber 108b of the tilt cylinder 108 through supply passages 128 and 129. The tilt valve 115 is connected to the tank 103 through discharge passages 130 and 122.

The lift valve 114 includes a main spool 131 and a flow regulator 132 built in the main spool 131. The above-described lift operation lever 116 is mechanically connected to the main spool 131.

The lift valve 114 includes an inner passage 133 which communicates the supply passage 119 and the common passage 117 with each other, an inner passage 134 which communicates the common passage 117 and the discharge passage 124 with each other, and an inner passage 135 which communicates the common passage 117 and the regeneration passage 125 with each other. The inner passage 135 is branched and connected to the inner passage 134.

The flow regulator 132 is disposed on the downstream side in relation to the branch connection point with respect to the inner passage 135 in the inner passage 134. A throttle portion 136 is disposed on the upstream side in relation to the branch connection point with respect to the inner passage 135 in the inner passage 134. A resistance component 137 is disposed in the inner passage 135.

A pilot passage 138 which guides a pilot pressure applied in the valve closing direction of the flow regulator 132 is connected to the upstream side of the throttle portion 136 in the inner passage 134. A pilot passage 139 which guides a pilot pressure applied in the valve opening direction of the flow regulator 132 is connected to the upstream side of the resistance component 137 in the inner passage 135. A pilot passage 140 which guides a pilot pressure applied in the valve opening direction of the flow regulator 132 is connected to the downstream side of the resistance component 137 in the inner passage 135.

The main spool 131 is movable between a full open position 131a in which the common passage 117 and the supply passage 119 communicate with each other through the inner passage 133 and the common passage 117 is blocked from the discharge passage 124 and the regeneration passage 125 and a full open position 131b in which the common passage 117 communicates with the discharge passage 124 and the regeneration passage 125 through the inner passages 134 and 135 and the common passage 117 is blocked from the supply passage 119. A neutral position (a full closed position) 131c in which the common passage 117 is blocked from the supply passage 119, the discharge passage 124, and the regeneration passage 125 exists between the full open position 131a and the full open position 131b.

In a state in which the main spool 131 is located at the neutral position 131c (a state of FIG. 15), a flow of the hydraulic oil does not occur among the hydraulic pump 104, the tank 103, and the lift cylinder 107. When the main spool 131 is moved from the neutral position 131c to the full open position 131a by the lift operation lever 116, the hydraulic oil discharged from the discharge port 104b of the hydraulic pump 104 flows in the supply passage 119, the inner passage 133, and the common passage 117 to be supplied to the lift cylinder 107. For this reason, the fork 113 is raised when the lift cylinder 107 is lengthened.

When the main spool 131 is moved from the neutral position 131c to the full open position 131b by the lift operation lever 116, the hydraulic oil which flows out of the lift cylinder 107 shortened due to the own weight of the fork 113 flows in the common passage 117 and enters the main spool 131. Then, the hydraulic oil flows in the inner passage 134 and the discharge passage 124 to be discharged to the tank 103 and flows in the inner passage 135 and the regeneration passage 125 to be supplied to the suction port 104a of the hydraulic pump 104. When the hydraulic oil is supplied from the lift cylinder 107 to the suction port 104a of the hydraulic pump 104, a so-called cargo handling regeneration (energy regeneration) in which the hydraulic pump 104 rotates due to the hydraulic oil is performed.

Figure 16:
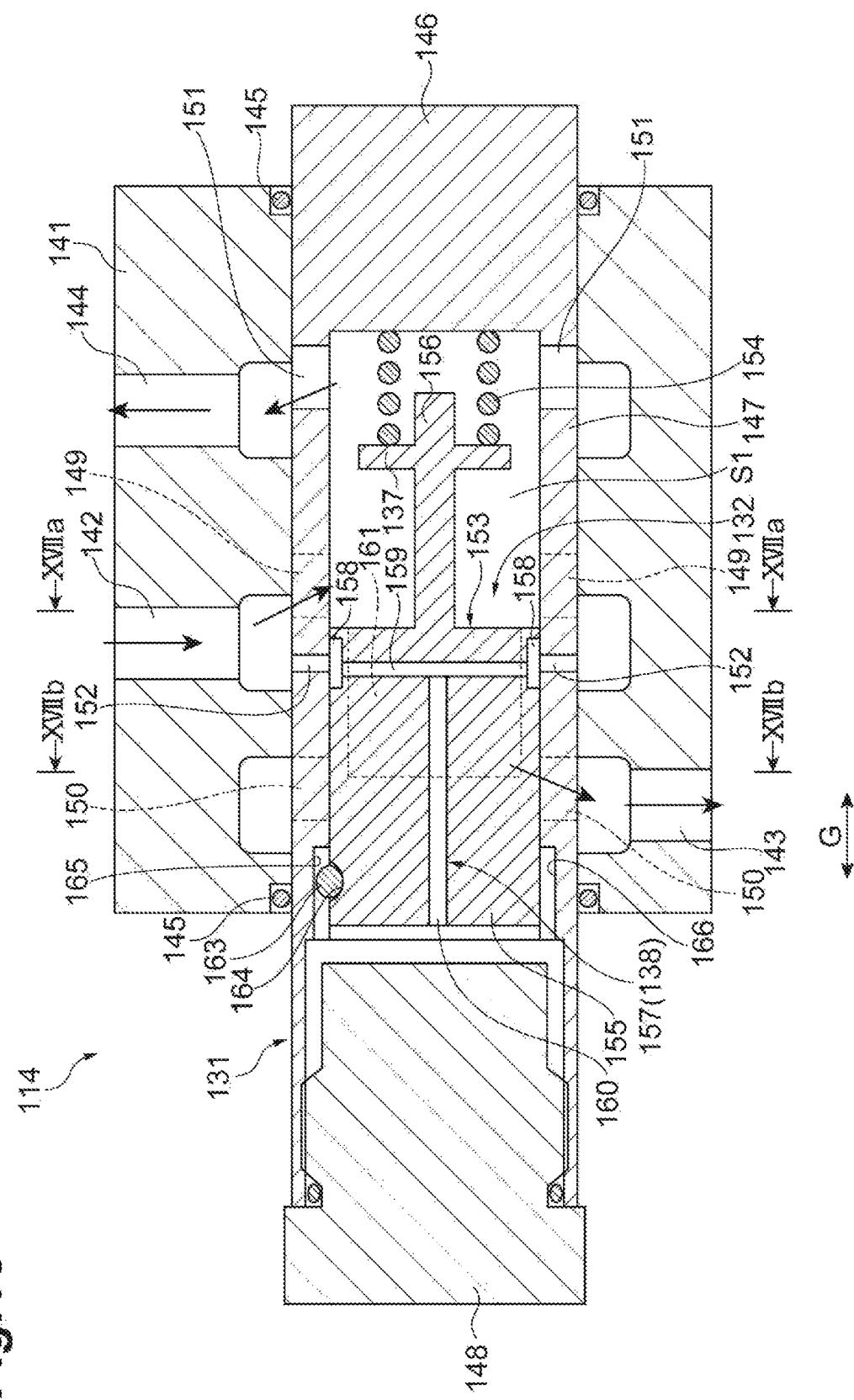
FIG. 16 is a cross-sectional view of a lift valve illustrated in FIG. 15.

FIG. 16 is a cross-sectional view of the lift valve 114. FIG. 17A is a cross-sectional view taken along a line XVIIa-XVIIa of FIG. 16 and FIG. 17B is a cross-sectional view taken along a line XVIIb-XVIIb of FIG. 16. In FIGS. 16 and 17, the lift valve 114 includes a housing 141, the above-described main spool 131 which is disposed to be movable with respect to the housing 141, and the above-described flow regulator 132 which is disposed inside the main spool 131.

The housing 141 is provided with hydraulic oil passages 142 to 144. The hydraulic oil passage 142 is a first hydraulic oil passage connected to the lift cylinder 107 through the common passage 117. The hydraulic oil passage 143 is a second hydraulic oil passage connected to the tank 103 through the discharge passage 124. The hydraulic oil passage 144 is a third hydraulic oil passage connected to the suction port 104a of the hydraulic pump 104 through the regeneration passage 125 and the suction passage 110. Further, although not illustrated in the drawings, the housing 141 is provided with a hydraulic oil passage connected to the discharge port 104b of the hydraulic pump 104 through the supply passage 119. Two seal rings 145 are interposed between the housing 141 and the main spool 131.

The main spool 131 includes a columnar base portion 146 and a cylindrical portion 147 extending from the base portion 146 in the axial direction (a direction G of FIG. 16). A front end portion of the cylindrical portion 147 is blocked by a plug 148. The main spool 131 is moved in the axial direction with respect to the housing 141 in response to the operation state of the lift operation lever 116.

The cylindrical portion 147 is provided with a plurality of (here, six) communication ports 149 (first communication ports) which communicate the hydraulic oil passage 142 with the inner space S1 (to be described later) of the main spool 131, a plurality of (here, six) communication ports 150 (second communication ports) which communicate the hydraulic oil passage 143 with the inner space S1 of the main spool 131, and a plurality of communication ports 151 (fourth communication ports) which communicate the hydraulic oil passage 144 with the inner space S1 of the main spool 131. Further, although not illustrated in the drawings, the cylindrical portion 147 is provided with a plurality of communication ports which communicate the inner space S of the main spool 131 with the hydraulic oil passage (described above) connected to the discharge port 104b of the hydraulic pump 104.

The communication port 149 is disposed between the communication port 150 and the communication port 151 in the axial direction of the main spool 131. The communication ports 149 and 150 are disposed at corresponding positions in the circumferential direction of the main spool 131. The communication port 149 constitutes the above-described throttle portion 136 (see FIG. 15) which generates a pressure difference in the main spool 131.

The cylindrical portion 147 is provided with two communication ports 152 (third communication ports) communicating with the hydraulic oil passage 142. The communication port 152 is disposed between the communication port 149 and the communication port 150 in the axial direction of the main spool 131. The communication port 152 is disposed at a position different from the communication ports 149 and 150 in the circumferential direction of the main spool 131.

The hydraulic oil passage 142, the communication port 149, the inner space S1 of the main spool 131, the communication port 150, and the hydraulic oil passage 143 constitute the above-described inner passage 134 (see FIG. 15). The inner space S1 of the main spool 131, the communication port 151, and the hydraulic oil passage 144 constitute the above-described inner passage 135 (see FIG. 15).

The flow regulator 132 controls the flow rate of the hydraulic oil flowing from the lift cylinder 107 to the tank 103. The flow regulator 132 includes a flow regulator spool 153 which is movable in the movement direction (the axial direction) of the main spool 131 with respect to the main spool 131 and a spring 154 which is disposed between the flow regulator spool 153 and the base portion 146 of the main spool 131.

The flow regulator spool 153 includes a columnar sliding portion 155 which slides on the cylindrical portion 147 of the main spool 131, a columnar rod portion 156 which extends from the sliding portion 155 toward the base portion 146, and the above-described resistance component 137 (see FIG. 15) which protrudes from the peripheral surface of the rod portion 156 in a flange shape.

A space which is defined by the inner wall surface of the flow regulator spool 153 along with the inner wall surfaces of the base portion 146 and the cylindrical portion 147 of the main spool 131 constitutes the inner space S1 of the main spool 131. That is, the inner space S1 of the main spool 131 means a space on the side of the spring 154 in relation to the sliding portion 155 inside the main spool 131.

The resistance component 137 generates pressure loss in the hydraulic oil flowing in the inner space S1 of the main spool 131 from the communication port 149 toward the communication port 151. Further, the resistance component 137 also has a function of receiving the spring 154. For this reason, the diameter of the resistance component 137 is larger than the diameter of the spring 154.

A portion between the sliding portion 155 and the resistance component 137 in the inner space S1 of the main spool 131, that is, an upstream side of the resistance component 137 in the inner space S1 of the main spool 131 constitutes the above-described pilot passage 139 (see FIG. 15) which guides a pilot pressure applied to the opening side of the flow regulator spool 153 (the left side of FIG. 16) when the hydraulic oil flows from the lift cylinder 107 to the tank 103. A portion between the resistance component 137 and the base portion 146 in the inner space S1 of the main spool 131, that is, a downstream side of the resistance component 137 in the inner space S1 of the main spool 131 constitute the above-described pilot passage 140 (see FIG. 15) which guides a pilot pressure applied to the opening side of the flow regulator spool 153 when the hydraulic oil flows from the lift cylinder 107 to the tank 103. That is, the pilot passages 139 and 140 guide a pilot pressure applied to the opening side of the communication port 150.

The sliding portion 155 is provided with the above-described pilot passage 138 (see FIG. 15) which guides a pilot pressure applied to the closing side of the flow regulator spool 153 (the right side of FIG. 16) when the hydraulic oil flows from the lift cylinder 107 to the tank 103. That is, the pilot passage 138 guides a pilot pressure applied to the closing side of the communication port 150. The above-described communication port 152 communicates the hydraulic oil passage 142 with the pilot passage 138.

The pilot passage 138 is formed as a through-hole 157 provided inside the sliding portion 155. The through-hole 157 includes two opening portions 158 which respectively communicate with the communication ports 152, a passage portion 159 which extends in the radial direction of the sliding portion 155 so as to connect the opening portions 158, and a passage portion 160 which is connected to the passage portion 159 and extends in the axial direction of the sliding portion 155. The width dimension (the axial dimension) of the opening portion 158 is larger than the width dimension of the communication port 152. The passage portion 160 is provided at the center portion of the sliding portion 155 in the radial direction and extends to a base end of the sliding portion 155 (an end opposite to the inner space S1 of the main spool 131 in the sliding portion 155).

A front end side portion of the sliding portion 155 (a portion on the side of the inner space S1 of the main spool 131 in the sliding portion 155) is provided with two semi-circular columnar hollow portions 161 as illustrated in FIGS. 17 and 18. In addition, FIG. 18A is a side view of the flow regulator spool 153 and FIG. 18B is a plan view of the flow regulator spool 153.

The hollow portion 161 is cut in a semi-circular columnar shape to face each communication port 150. Accordingly, each communication port 150 can communicate with the inner space S of the main spool 131. The sliding portion 155 is provided with a protrusion 162 which protrudes to the front end side by two hollow portions 161. The rod portion 156 extends from a front end of the protrusion 162.

Such a flow regulator 132 is driven by a pressure difference generated in the main spool 131, specifically, a pressure difference between the upstream side and the downstream side of the communication port 149 (the throttle portion 136) of the main spool 131 and controls the flow rate (the bypass flow rate) of the hydraulic oil flowing in the hydraulic oil passage 143 to maintain the pressure difference constant. At this time, an opening degree of the flow regulator spool 153 changes in response to the pressure difference between the upstream side and the downstream side of the communication port 149 so that a bypass flow rate changes. The pressure difference between the upstream side and the downstream side of the communication port 149 (the throttle portion 136) corresponds to a pressure difference between the pilot pressure of the pilot passage 138 and the pilot pressure of the pilot passage 139. The opening degree of the flow regulator spool 153 is the opening degree of the communication port 150.

A rotation regulation member 163 is disposed between a base end side portion of the sliding portion 155 of the flow regulator spool 153 and the cylindrical portion 147 of the main spool 131. Since the sliding portion 155 is provided with the hollow portion 161, a relative rotational phase shift tends to occur between the flow regulator spool 153 and the main spool 131 when the sliding portion 155 slides on the cylindrical portion 147. The rotation regulation member 163 is a member that regulates a relative rotation between the flow regulator spool 153 and the main spool 131. The rotation regulation member 163 is, for example, a spherical body formed of metal. Additionally, the rotation regulation member 163 may have a cube or rectangular parallelepiped shape.

A peripheral surface of the base end side portion of the sliding portion 155 is provided with a concave portion 164 to which a part of the rotation regulation member 163 is fitted. The concave portion 164 is disposed at a position corresponding to one opening portion 158 in the circumferential direction of the sliding portion 155.

Figure 19:
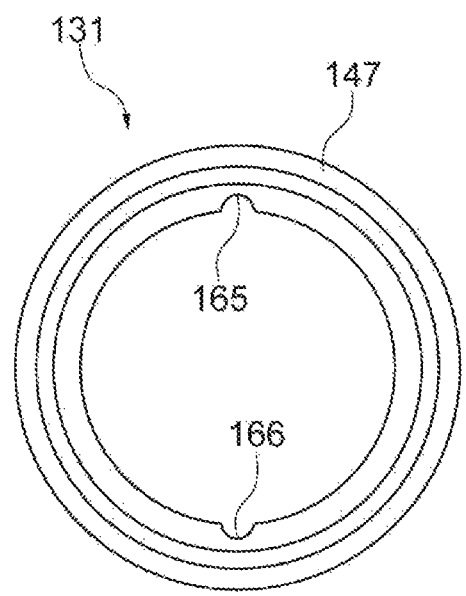
FIG. 19 is a front view of a main spool illustrated in FIG. 16.

As illustrated in FIG. 19, a receiving groove 165 which receives the rotation regulation member 163 fitted to the concave portion 164 is provided at a position corresponding to the concave portion 164 of the inner peripheral surface of the cylindrical portion 147. The receiving groove 165 extends in the axial direction of the cylindrical portion 147. Additionally, FIG. 19 is a front view of the main spool 131.

An eccentric prevention groove 166 which extends in the axial direction of the cylindrical portion 147 is provided on the opposite side to the receiving groove 165 with respect to the axis of the cylindrical portion 147 of the inner peripheral surface of the cylindrical portion 147 (the axis of the sliding portion 155). That is, the eccentric prevention groove 166 is provided at a position corresponding to the opposite side to the rotation regulation member 163 with respect to the axis of the sliding portion 155 of the inner peripheral surface of the cylindrical portion 147. Since the rotation regulation member 163 is disposed between the cylindrical portion 147 and the sliding portion 155, a pressure applied to the sliding portion 155 of the flow regulator spool 153 becomes unbalanced in the circumferential direction of the sliding portion 155. For this reason, a force is easily generated in the flow regulator spool 153 in the eccentric direction. The eccentric prevention groove 166 is a groove that prevents the eccentricity of the flow regulator spool 153.

As described above, in the present embodiment, the flow regulator 132 which controls the flow rate of the hydraulic oil flowing from the lift cylinder 107 to the tank 103 is disposed inside the main spool 131 moving with respect to the housing 141 in response to the operation state of the lift operation lever 116. For this reason, a pilot electromagnetic proportional valve or the like for controlling the main spool 131 may not be disposed outside the main spool 131. Further, since the opening degree of the flow regulator spool 153 changes in response to a pressure difference between a pilot pressure applied to the closing side of the flow regulator spool 153 and a pilot pressure applied to the opening side of the flow regulator spool 153 in the flow regulator 132, the flow rate of the hydraulic oil flowing from the lift cylinder 107 to the tank 103 changes. Here, the pilot passage 138 which guides a pilot pressure applied to the closing side of the flow regulator spool 153 is provided in the flow regulator spool 153. Thus, since the pilot passage 138 may not be provided in the housing 141, the housing 141 is decreased in size to that extent. With the above-described configuration, it is possible to realize space saving and low cost of the hydraulic driving device 101.

Further, in the present embodiment, the flow regulator spool 153 includes the columnar sliding portion 155 which slides on the main spool 131 and the pilot passage 138 is a through-hole 157 which is provided inside the sliding portion 155 and extends to the base end of the sliding portion 155 in the axial direction of the sliding portion 155. Thus, the pilot passage 138 can guide a pilot pressure applied to the closing side of the flow regulator spool 153 without influencing the sliding performance of the sliding portion 155 with respect to the main spool 131.

Further, in the present embodiment, the front end side portion of the sliding portion 155 is provided with the hollow portion 161 which faces the communication port 150. Thus, the inner space S1 of the main spool 131 can reliably communicate with the communication port 150 by the hollow portion 161 with a simple structure, for example, even when the axial dimension of the sliding portion 155 is set to be large in order to ensure the pilot passage 138.

Further, in the present embodiment, the rotation regulation member 163 which regulates a relative rotation between the flow regulator spool 153 and the main spool 131 is disposed between the base end side portion of the sliding portion 155 and the main spool 131. Thus, since the sliding portion 155 is provided with the hollow portion 161, a relative rotation between the flow regulator spool 153 and the main spool 131 is prevented by the rotation regulation member 163 even when the flow regulator spool 153 and the main spool 131 tend to relatively rotate during the sliding movement of the sliding portion 155.

Further, in the present embodiment, the eccentric prevention groove 166 which prevents the eccentricity of the flow regulator spool 153 is provided at a position corresponding to the opposite side to the rotation regulation member 163 with respect to the axis of the sliding portion 155 of the main spool 131. Thus, an unbalanced pressure is eliminated by the eccentric prevention groove 166 even when the flow regulator spool 153 tries to be eccentric since a pressure applied to the flow regulator spool 153 becomes unbalanced due to the rotation regulation member 163. Thus, since the eccentricity of the flow regulator spool 153 is prevented, the sliding performance of the sliding portion 155 is improved.

Further, in the present embodiment, it is possible to perform a so-called cargo handling regeneration operation in which the hydraulic pump 104 rotates due to the supply of the hydraulic oil from the lift cylinder 107 to the suction port 104a of the hydraulic pump 104 through the hydraulic oil passage 144.

Further, in the present embodiment, since the opening degree of the flow regulator spool 153 automatically changes due to the pilot pressures of the pilot passages 138 and 139 regardless of the load of the cargo loaded on the fork 113 when the fork 113 is lowered, a change in the lowering speed of the fork 113 is small and a desired operation feeling of an operator can be obtained. Further, since the opening degree of the flow regulator spool 153 automatically changes due to the pilot pressures of the pilot passages 138 and 139 even when the number of rotations of the hydraulic pump 104 changes when a complex operation including a mast tilting operation is performed while the fork 113 is lowered, a change in the lowering speed of the fork 113 is small and a desired operation feeling of the operator can be obtained.

Figure 20A:
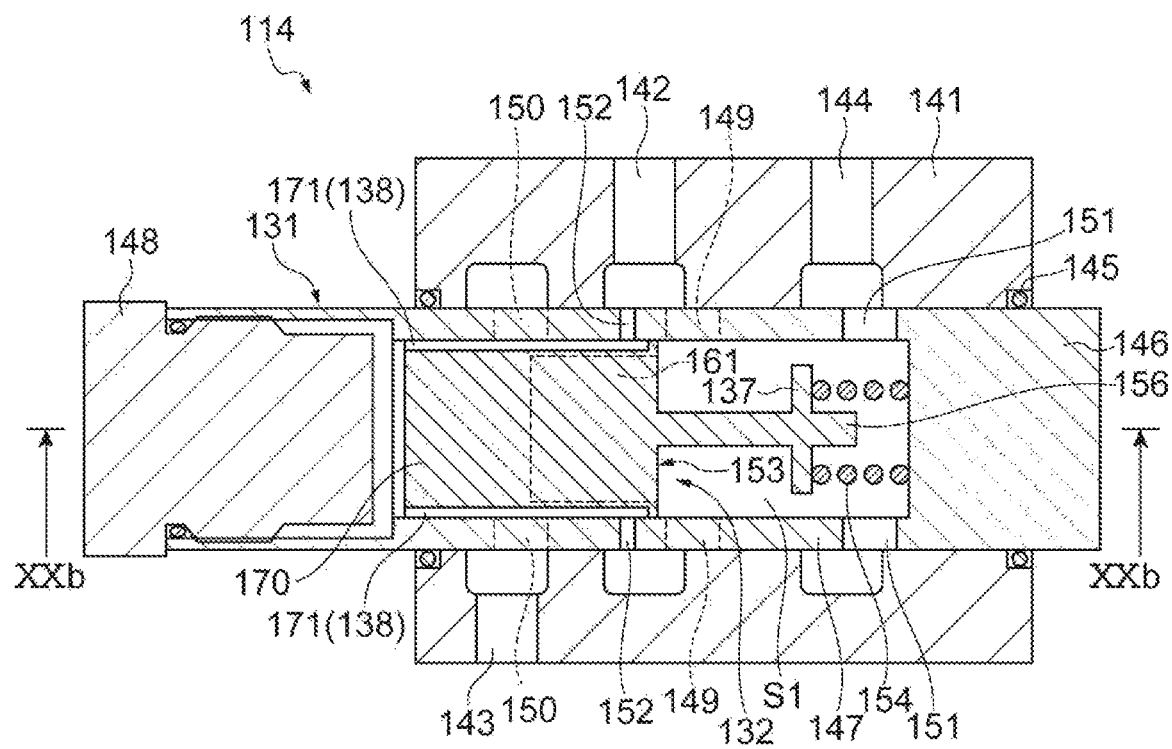
FIG. 20A is a cross-sectional view illustrating a modified example of a lift valve as a hydraulic driving device according to another embodiment of the present disclosure and FIG. 20B is a cross-sectional view taken along a line XXb-XXb of FIG. 20A.
Figure 20B:
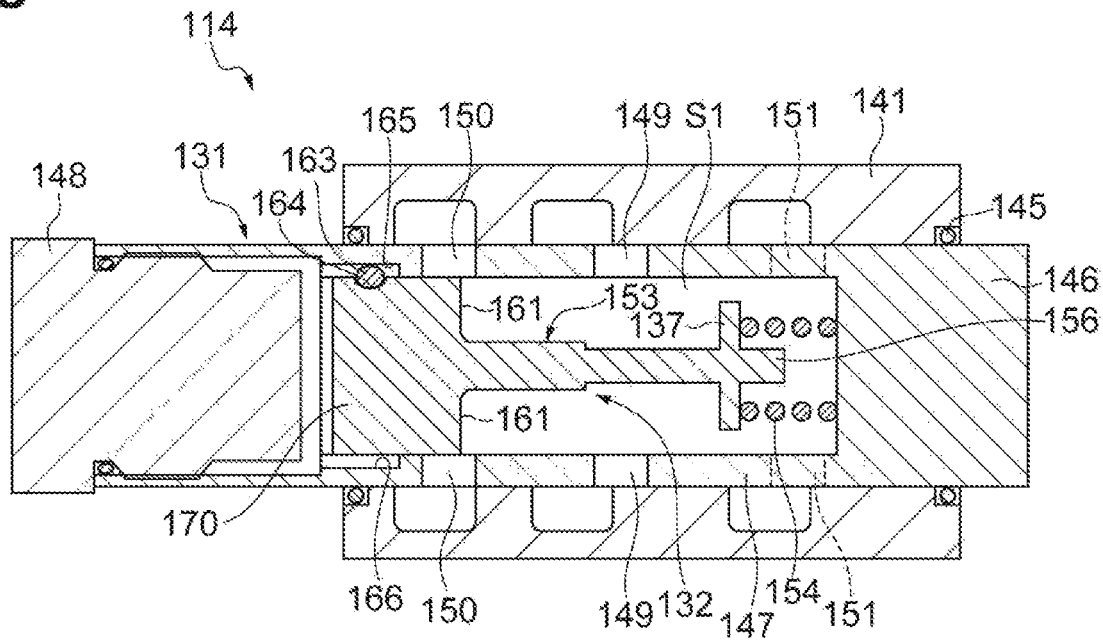

FIG. 20A is a cross-sectional view illustrating a modified example of a lift valve as a hydraulic driving device according to another embodiment of the present disclosure and FIG. 20B is a cross-sectional view taken along a line XXb-XXb of FIG. 20A. In FIGS. 20A and 20B, the present embodiment is different from the above-described embodiment in the structure of the flow regulator spool 153 of the flow regulator 132 of the lift valve 114.

The flow regulator spool 153 includes a sliding portion 170 instead of the sliding portion 155 of the above-described embodiment. A front end side portion of the sliding portion 170 is provided with a semi-columnar hollow portion 161 which faces the communication port 150 similarly to the above-described sliding portion 155.

The sliding portion 170 is provided with the pilot passage 138 (described above) which guides a pilot pressure applied to the closing side of the flow regulator spool 153 (the right side of FIGS. 20A and 20B) when the hydraulic oil flows from the lift cylinder 107 to the tank 103. The pilot passage 138 includes two groove portions 171 provided on the peripheral surface of the sliding portion 170. The groove portion 171 communicates with the communication port 152. As illustrated in FIG. 21B, the groove portion 171 extends to a base end of the sliding portion 170 (an end opposite to the inner space S1 of the main spool 131 in the sliding portion 170). Additionally, FIG. 21A is a side view of the flow regulator spool 153 and FIG. 21B is a plan view of the flow regulator spool 153.

The above-described rotation regulation member 163 is disposed between the cylindrical portion 147 of the main spool 131 and the sliding portion 170. The peripheral surface of the sliding portion 170 is provided with the above-described concave portion 164. The concave portion 164 is disposed at a position offset from the groove portion 171 by 90° in the circumferential direction of the sliding portion 170. Further, the inner peripheral surface of the cylindrical portion 147 is provided with the above-described receiving groove 165 and the above-described eccentric prevention groove 166. The receiving groove 165 and the eccentric prevention groove 166 are also disposed at a position offset from the groove portion 171 by 90° in the circumferential direction of the cylindrical portion 147.

In the present embodiment, the pilot passage 138 is the groove portion 171 which is provided on the peripheral surface of the sliding portion 170 and extends to the base end of the sliding portion 170 in the axial direction of the sliding portion 170. Thus, the pilot passage 138 can be easily processed in the sliding portion 170.

Figure 22A:
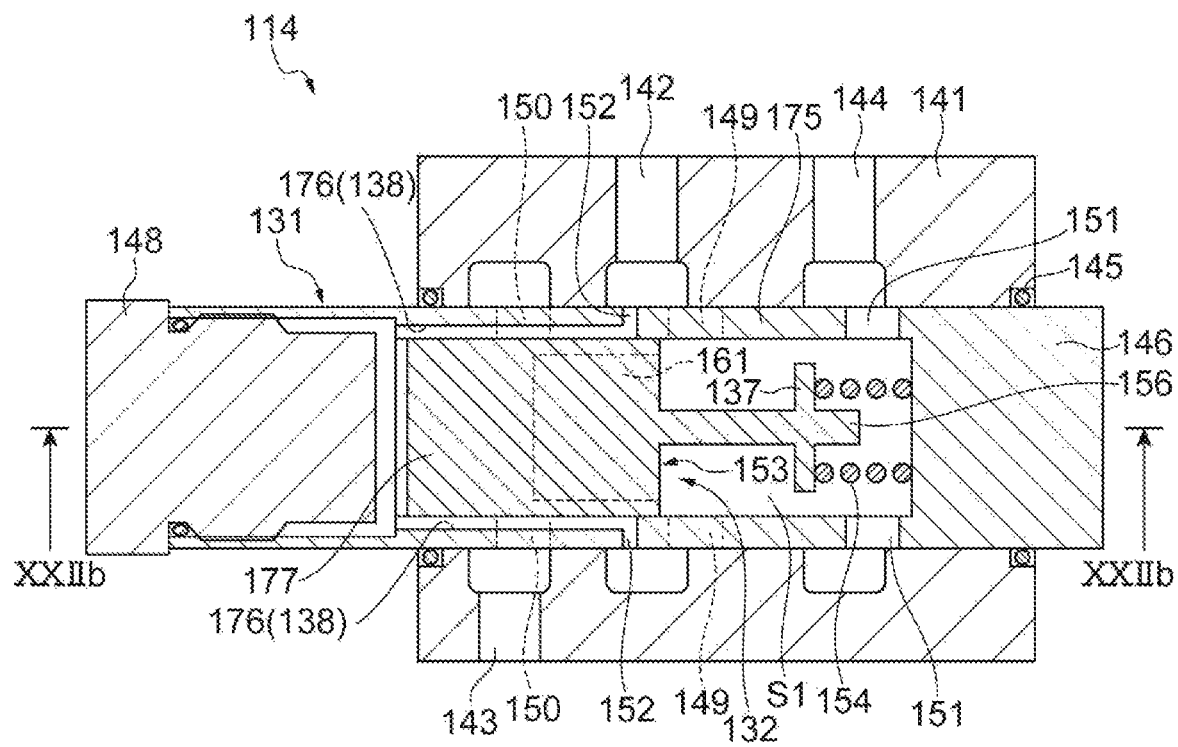
FIG. 22A is a cross-sectional view illustrating another modified example of a lift valve as a hydraulic driving device according to a still another embodiment of the present disclosure and FIG. 22B is a cross-sectional view taken along a line XXIIb-XXIIb of FIG. 22A.
Figure 22B:
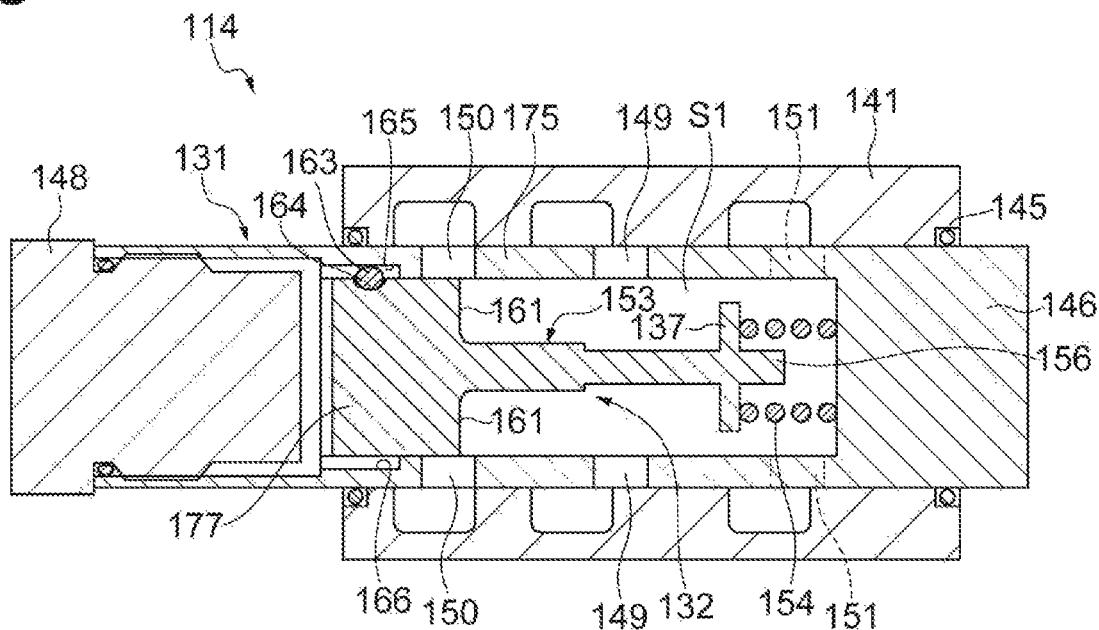

FIG. 22A is a cross-sectional view illustrating another modified example of a lift valve as a hydraulic driving device according to a still another embodiment of the present disclosure and FIG. 22B is a cross-sectional view taken along a line XXIIb-XXIIb of FIG. 22A. In FIGS. 22A and 22B, the present embodiment is different from the above-described embodiment in the structures of the flow regulator spool 153 of the flow regulator 132 and the main spool 131 of the lift valve 114.

The main spool 131 includes a cylindrical portion 175 instead of the cylindrical portion 147 of the above-described embodiment. The cylindrical portion 175 is provided with the above-described communication ports 149 to 152.

Further, the cylindrical portion 175 is provided with the pilot passage 138 (described above) which guides a pilot pressure applied to the closing side of the flow regulator spool 153 (the right side of FIGS. 22A and 22B) when the hydraulic oil flows from the lift cylinder 107 to the tank 103. The pilot passage 138 is formed as two groove portions 176 provided on the inner peripheral surface of the cylindrical portion 175. The groove portion 176 communicates with the communication port 152.

Figure 23:
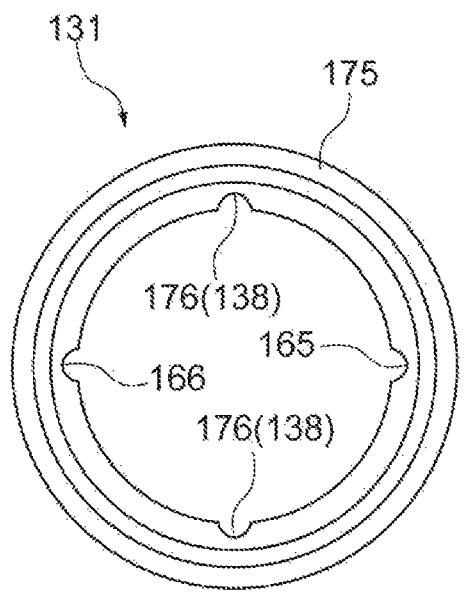
FIG. 23 is a front view of a main spool illustrated in FIGS. 22A and 22B.

Each groove portion 176 is disposed at a position offset from the above-described receiving groove 165 and the above-described eccentric prevention groove 166 by 90° in the circumferential direction of the cylindrical portion 175 as illustrated in FIG. 23. Additionally, FIG. 23 is a front view of the main spool 131.

The flow regulator spool 153 includes a sliding portion 177 instead of the sliding portion 155 of the above-described embodiment. The front end side portion of the sliding portion 177 is provided with the semi-circular columnar hollow portion 161 which faces the communication port 150 similarly to the above-described sliding portion 155. However, the sliding portion 177 is not provided with the pilot passage.

In the present embodiment, the main spool 131 is provided with the pilot passage 138 which guides a pilot pressure applied to the closing side of the flow regulator spool 153. Thus, since the pilot passage 138 may not be provided in the housing 141, the housing 141 decreases in size to that extent. Accordingly, the flow regulator 132 is disposed inside the main spool 131 and space saving and low cost of the hydraulic driving device 101 can be realized.

Further, the present disclosure is not limited to the above-described embodiment. For example, in the above-described embodiment, the cargo handling regeneration of the hydraulic pump 104 is performed, the present disclosure can be also applied to the cargo handling valve unit 109 without the cargo handling regeneration function. The lift valve 114 used in the cargo handling valve unit 109 without the cargo handling regeneration function is illustrated in FIG. 24.

Figure 24:
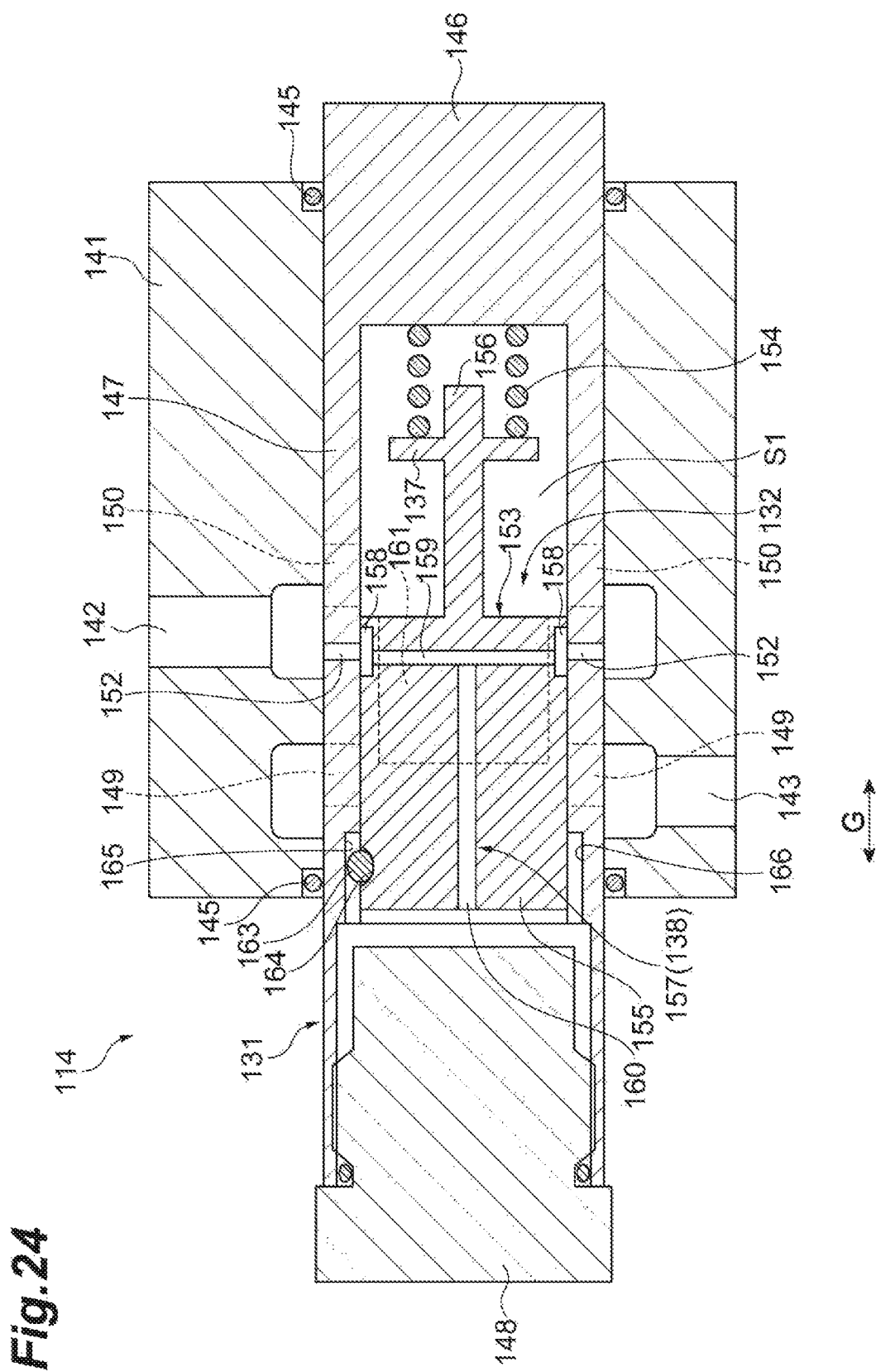
FIG. 24 is a cross-sectional view illustrating a modified example of the lift valve illustrated in FIG. 16.

FIG. 24 is a cross-sectional view illustrating a modified example of the lift valve 114 illustrated in FIG. 16. In FIG. 24, the housing 141 is provided with the above-described hydraulic oil passages 142 and 143, but is not provided with the above-described hydraulic oil passage 144. The main spool 131 is provided with the above-described communication ports 149, 150, and 152, but is not provided with the above-described communication port 151.

Further, in the above-described embodiment, the eccentric prevention groove 166 which prevents the eccentricity of the flow regulator spool 153 is provided at a position corresponding to the opposite side to the rotation regulation member 163 with respect to the axis of the cylindrical portion 147 in the cylindrical portion 147 of the main spool 131, but the eccentric prevention groove is not particularly limited to that type. For example, the eccentric prevention groove may be provided at a position corresponding to the opposite side to the rotation regulation member 163 with respect to the axis of the sliding portion in the sliding portion of the flow regulator spool 153.

Further, in the above-described embodiment, the lift valve 114 is a manual direction switching valve in which the lift operation lever 116 is mechanically connected to the main spool 131, but the lift valve 114 is not particularly limited to that type. For example, an electromagnetic pilot type direction switching valve may be used.

Further, the hydraulic driving device 101 of the above-described embodiment is mounted on the electric forklift 102, but the present disclosure can be also applied to an engine type forklift. Further, the present disclosure can be also applied to a forklift including an attachment.

Further, in the above-described embodiment, the lift valve 114 including the main spool 131 and the flow regulator 132 are disposed among the hydraulic pump 104, the tank 103, and the lift cylinder 107, but the present disclosure can be also applied to an industrial vehicle other than the forklift in which the direction switching valve is disposed among the hydraulic pump, the tank, and the hydraulic cylinder.

What is claimed is:

1. A hydraulic driving device of an industrial vehicle comprising:
    a tank which stores hydraulic oil;
    a hydraulic pump which includes a suction port sucking the hydraulic oil and a discharge port discharging the hydraulic oil;
    a hydraulic cylinder which is driven by the hydraulic oil discharged from the discharge port of the hydraulic pump;
    a direction switching valve which is disposed among the hydraulic pump, the tank, and the hydraulic cylinder and switches a hydraulic oil flow direction in response to an operation state of operation means for driving the hydraulic cylinder;
    a common hydraulic oil passage which connects the hydraulic cylinder to the direction switching valve so that the hydraulic oil flows in both directions between the hydraulic cylinder and the direction switching valve;
    a first hydraulic oil passage which connects the discharge port of the hydraulic pump to the direction switching valve so that the hydraulic oil flows from the hydraulic pump to the direction switching valve;
    a second hydraulic oil passage which connects the tank to the direction switching valve so that the hydraulic oil flows from the direction switching valve to the tank;
    a third hydraulic oil passage which connects the suction port of the hydraulic pump to the direction switching valve so that the hydraulic oil flows from the direction switching valve to the hydraulic pump,
    wherein the direction switching valve includes a main spool which moves in response to the operation state of the operation means and a flow regulator which is disposed inside the main spool to control a flow rate of the hydraulic oil flowing from the hydraulic cylinder to the tank,
    wherein the flow regulator includes a flow regulator spool which is movable in a movement direction of the main spool with respect to the main spool, and
    wherein the direction switching valve includes a first pilot passage which applies a pressure to a closing side of the flow regulator spool and a second pilot passage which applies a pressure to an opening side of the flow regulator spool.

2. The hydraulic driving device of the industrial vehicle according to claim 1,
    wherein the direction switching valve includes a resistance component which generates pressure loss in the hydraulic oil flowing from the common hydraulic oil passage to the third hydraulic oil passage.

3. The hydraulic driving device of the industrial vehicle according to claim 2,
    wherein the flow regulator spool includes a sliding portion which slides with respect to the main spool and a rod portion which extends from the sliding portion in the movement direction of the main spool, and
    wherein the resistance component is a flange-shaped resistance component which protrudes from a peripheral surface of the rod portion.

4. The hydraulic driving device of the industrial vehicle according to claim 3,
    wherein the flow regulator includes a spring which urges the flow regulator spool in an opening direction, and
    wherein the flange-shaped resistance component receives the spring.

5. The hydraulic driving device of the industrial vehicle according to claim 3,
    wherein an outer peripheral edge of the flange-shaped resistance component has a knife edge shape.

6. The hydraulic driving device of the industrial vehicle according to claim 3,
    wherein the flange-shaped resistance component is provided with a through-hole penetrating in the movement direction of the main spool.

7. The hydraulic driving device of the industrial vehicle according to claim 3,
    wherein an inner diameter of a region corresponding to the flange-shaped resistance component in the main spool is larger than an inner diameter of a region corresponding to the sliding portion in the main spool.

8. A hydraulic driving device of an industrial vehicle comprising:
    a tank which stores hydraulic oil;
    a hydraulic pump which includes a suction port sucking the hydraulic oil and a discharge port discharging the hydraulic oil;
    a hydraulic cylinder which is driven by the hydraulic oil discharged from the discharge port of the hydraulic pump;
    a direction switching valve which is disposed among the hydraulic pump, the tank, and the hydraulic cylinder and switches a hydraulic oil flow direction in response to an operation state of operation means for driving the hydraulic cylinder;
    wherein the direction switching valve includes a main spool which moves in response to the operation state of the operation means and a flow regulator which is disposed inside the main spool to control a flow rate of the hydraulic oil flowing from the hydraulic cylinder to the tank, wherein the direction switching valve includes a housing,
wherein the main spool moves with respect to the housing in response to the operation state of the operation means,
wherein the flow regulator includes a flow regulator spool which is movable in a movement direction of the main spool with respect to the main spool,
wherein the housing is provided with a first hydraulic oil passage connected to the hydraulic cylinder and a second hydraulic oil passage connected to the tank,
wherein the flow regulator spool is provided with a pilot passage which guides a pilot pressure applied to a closing side of the flow regulator spool,
wherein the main spool is provided with a first communication port which communicates the first hydraulic oil passage with an inner space of the main spool, a second communication port which communicates the second hydraulic oil passage with the inner space of the main spool, and a third communication port which communicates the first hydraulic oil passage with the pilot passage,
wherein the housing is provided with a third hydraulic oil passage which is connected to the suction port of the hydraulic pump, and
wherein the main spool is provided with a fourth communication port which communicates the third hydraulic oil passage with the inner space of the main spool.

9. The hydraulic driving device of the industrial vehicle according to claim 8,
wherein the flow regulator spool includes a columnar sliding portion which slides with respect to the main spool, and
wherein the pilot passage is a through-hole which is provided inside the sliding portion and extends in an axial direction of the sliding portion to an end opposite to the inner space of the main spool of the sliding portion.

10. The hydraulic driving device of the industrial vehicle according to claim 8,
wherein the flow regulator spool includes a columnar sliding portion which slides with respect to the main spool, and
wherein the pilot passage is a groove portion which is provided on a peripheral surface of the sliding portion and extends in an axial direction of the sliding portion to an end opposite to the inner space of the main spool of the sliding portion.

11. The hydraulic driving device of the industrial vehicle according to claim 9,
wherein the sliding portion of the flow regulator spool is provided with a hollow portion that faces the second communication port of the main spool and communicates fluid between the second communication port and the inner space of the main spool.

12. The hydraulic driving device of the industrial vehicle according to claim 11,
wherein a rotation regulation member, that regulates a relative rotation between the flow regulator spool and the main spool, is disposed between the main spool and a portion of the sliding portion that is opposite to the inner space of the main spool.

13. The hydraulic driving device of the industrial vehicle according to claim 12,
wherein an eccentric prevention groove which prevents the eccentricity of the flow regulator spool is provided at a position corresponding to the opposite side to the rotation regulation member with respect to an axis of the sliding portion in the main spool or the sliding portion.

14. A hydraulic driving device of an industrial vehicle comprising:
a tank which stores hydraulic oil;
a hydraulic pump which includes a suction port sucking the hydraulic oil and a discharge port discharging the hydraulic oil;
a hydraulic cylinder which is driven by the hydraulic oil discharged from the discharge port of the hydraulic pump;
a direction switching valve which is disposed among the hydraulic pump, the tank, and the hydraulic cylinder and switches a hydraulic oil flow direction in response to an operation state of operation means for driving the hydraulic cylinder;
wherein the direction switching valve includes a main spool which moves in response to the operation state of the operation means and a flow regulator which is disposed inside the main spool to control a flow rate of the hydraulic oil flowing from the hydraulic cylinder to the tank,
wherein the direction switching valve includes a housing,
wherein the main spool moves with respect to the housing in response to the operation state of the operation means,
wherein the flow regulator includes a flow regulator spool which is movable in a movement direction of the main spool with respect to the main spool,
wherein the housing is provided with a first hydraulic oil passage connected to the hydraulic cylinder and a second hydraulic oil passage connected to the tank, and
wherein the main spool is provided with a pilot passage which guides a pilot pressure applied to a closing side of the flow regulator spool, a first communication port which communicates the first hydraulic oil passage with an inner space of the main spool, a second communication port which communicates the second hydraulic oil passage with the inner space of the main spool, and a third communication port which communicates the first hydraulic oil passage with the pilot passage.

15. The hydraulic driving device of the industrial vehicle according to claim 14,
wherein the housing is provided with a third hydraulic oil passage which is connected to the suction port of the hydraulic pump, and
wherein the main spool is provided with a fourth communication port which communicates the third hydraulic oil passage with the inner space of the main spool.

* * * * *

UNITED STATES PATENT AND TRADEMARK OFFICE
CERTIFICATE OF CORRECTION

| | | |
|---|---|---|
| PATENT NO. | : 10,816,018 B2 | Page 1 of 1 |
| APPLICATION NO. | : 16/053202 | |
| DATED | : October 27, 2020 | |
| INVENTOR(S) | : Yuki Ueda et al. | |

It is certified that error appears in the above-identified patent and that said Letters Patent is hereby corrected as shown below:

On the Title Page

Item [73]:
Delete "KABUSHIKI KAISHA TOYOTA JIDOSHOKKI, Kariya-shi, Aichi (JP); NISHIA INDUSTRIAL CO., LTD., Nagano-shi, Nagano (JP)"
Insert --KABUSHIKI KAISHA TOYOTA JIDOSHOKKI, Kariya-shi, Aichi (JP); NISHINA INDUSTRIAL CO., LTD., Nagano-shi, Nagano (JP)--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*